United States Patent
Hashimura et al.

(10) Patent No.: US 9,732,407 B2
(45) Date of Patent: Aug. 15, 2017

(54) BEARING STEEL AND METHOD FOR PRODUCING SAME

(71) Applicant: NIPPON STEEL & SUMITOMO METAL CORPORATION, Tokyo (JP)

(72) Inventors: Masayuki Hashimura, Tokyo (JP); Masafumi Miyazaki, Tokyo (JP); Hideaki Yamamura, Tokyo (JP); Takahisa Suzuki, Tokyo (JP); Takashi Fujita, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 640 days.

(21) Appl. No.: 14/352,290

(22) PCT Filed: Oct. 5, 2012

(86) PCT No.: PCT/JP2012/076042
§ 371 (c)(1),
(2) Date: Apr. 16, 2014

(87) PCT Pub. No.: WO2013/058131
PCT Pub. Date: Apr. 25, 2013

(65) Prior Publication Data
US 2014/0261906 A1    Sep. 18, 2014

(30) Foreign Application Priority Data
Oct. 20, 2011  (JP) .................................. 2011-230832

(51) Int. Cl.
*C22C 38/02*    (2006.01)
*C22C 38/04*    (2006.01)
(Continued)

(52) U.S. Cl.
CPC .............. *C22C 38/50* (2013.01); *B22D 11/015* (2013.01); *B22D 27/02* (2013.01); *C21C 7/06* (2013.01);
(Continued)

(58) Field of Classification Search
CPC ... C22C 38/001; C22C 38/002; C22C 38/005; C22C 38/02; C22C 38/04; C22C 38/06;
(Continued)

(56) References Cited

U.S. PATENT DOCUMENTS 4,956,009 A * 9/1990 Robison, Jr. .......... C21C 7/0645
                                                         420/129
6,117,389 A * 9/2000 Nabeshima ............... C21C 7/06
                                                         164/474
(Continued)

FOREIGN PATENT DOCUMENTS

CA    2788713 A1    8/2011
CN    100427628 C   10/2008
(Continued)

OTHER PUBLICATIONS

Extended European Search Report, dated Oct. 7, 2015, for European Application No. 12842522.0.
(Continued)

*Primary Examiner* — Helene Klemanski
(74) *Attorney, Agent, or Firm* — Birch, Stewart, Kolasch & Birch, LLP

(57) ABSTRACT

A bearing steel includes, as a metallographic structure, inclusions which contain complex oxysulfides including Rare Earth Metal, Ca, O, S, and Al, TiN, MnS, $Al_2O_3$, and complex oxides including Al and Ca, wherein, a number fraction of the complex oxysulfides in a total number of the inclusions is 50% to less than 100% and a number of complex oxysulfides having a major axis of 5 μm or more is
(Continued)

0.001 pieces to 2 pieces in an observed section of 1 mm², and a number of TiN existing independently from the complex oxysulfides and having a major axis of 5 μm or more is 0.001 pieces to less than 1.0 piece in an observed section of 1 mm².

17 Claims, 2 Drawing Sheets

(51) Int. Cl.

| | |
|---|---|
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/42 | (2006.01) |
| C22C 38/44 | (2006.01) |
| C22C 38/46 | (2006.01) |
| C22C 38/50 | (2006.01) |
| C21C 7/06 | (2006.01) |
| C21D 1/32 | (2006.01) |
| C21D 9/40 | (2006.01) |
| C21D 9/36 | (2006.01) |
| B22D 11/01 | (2006.01) |
| B22D 27/02 | (2006.01) |
| C21D 8/00 | (2006.01) |
| C22C 38/00 | (2006.01) |
| C21C 7/064 | (2006.01) |
| F16C 33/62 | (2006.01) |

(52) U.S. Cl.
CPC .............. *C21C 7/0645* (2013.01); *C21D 1/32* (2013.01); *C21D 8/005* (2013.01); *C21D 9/36* (2013.01); *C21D 9/40* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *F16C 33/62* (2013.01); *F16C 2300/02* (2013.01)

(58) Field of Classification Search
CPC ......... C22C 38/20; C22C 38/22; C22C 38/24; C22C 38/26; C22C 38/28; C22C 38/32; C22C 38/42; C22C 38/44; C22C 38/46; C22C 38/50; C21C 7/06; C21C 7/0645; C21D 1/32; C21D 9/36; C21D 9/40
USPC .................. 148/330, 331, 333, 544, 546
See application file for complete search history.

(56) References Cited

U.S. PATENT DOCUMENTS

| | | | | |
|---|---|---|---|---|
| 6,120,578 | A * | 9/2000 | Nakato | C21C 7/06 148/625 |
| 6,841,123 | B1 * | 1/2005 | Nabeshima | C22C 38/002 148/320 |
| 6,858,101 | B1 * | 2/2005 | Hashimura | C22C 38/002 148/330 |
| 7,776,162 | B2 * | 8/2010 | Mizoguchi | C21C 7/06 148/331 |
| 2006/0157162 | A1 | 7/2006 | Hirata et al. | |
| 2012/0291907 | A1 * | 11/2012 | Fujishiro | C22C 38/002 138/171 |

FOREIGN PATENT DOCUMENTS

| | | |
|---|---|---|
| CN | 101787488 A | 7/2010 |
| JP | 8-120401 A | 5/1996 |
| JP | 9-263820 A | 10/1997 |
| JP | 11-279695 A | 10/1999 |
| JP | 2000-273525 A | 10/2000 |
| JP | 2004-277777 A | 10/2004 |
| JP | 2007-254818 A | 10/2007 |
| JP | 2011-117010 A | 6/2011 |

OTHER PUBLICATIONS

Chinese Office Action and Search Report and partial English translation thereof, dated Apr. 30, 2015, for Chinese Application No. 201280051082.1.
International Search Report for PCT/JP2012/076042 mailed on Dec. 25, 2012.
Written Opinion of the International Searching Authority for PCT/JP2012/076042 mailed on Dec. 25, 2012.

* cited by examiner

BEARING STEEL AND METHOD FOR PRODUCING SAME

TECHNICAL FIELD

The present invention relates to a bearing steel in which an influence of harmful inclusions such as aluminum oxides, titanium nitrides, and manganese sulfides is suppressed by controlling formation of complex oxysulfides including REM (Rare Earth Metal) and which has excellent fatigue properties, and a method for producing the same.

Priority is claimed on Japanese Patent Application No. 2011-230832, filed on Oct. 20, 2011, and the contents of which are incorporated herein by reference.

BACKGROUND ART

Bearing steel is used in a rolling bearing such as a "ball bearing" or a "roller bearing" which is used in various industrial machines or vehicles. In addition, in recent years, for example, the bearing steel has also been used in a bearing for a disk drive or the like used in a hard disk device which is a magnetic recording medium. In addition, the bearing steel is also used in a bearing for an electronic device, a household electric appliance, a measuring instrument, a medical instrument, or the like.

It is required for the bearing steel used in the bearings to be excellent in rolling fatigue properties. When the bearing steel includes coarse inclusions and a large number of inclusions, fatigue life is negatively influenced. Accordingly, it is desirable that the inclusions are as fine as possible and a number of the inclusions is as small as possible in order to improve the fatigue properties.

Oxides such as alumina ($Al_2O_3$), sulfides such as manganese sulfides (MnS), nitrides such as titanium nitrides (TiN), or the like is known as harmful inclusions included in the bearing steel.

A large amount of dissolved oxygen is included in molten steel made in a converter or a vacuum processing chamber. Alumina inclusions are formed by combining the dissolved oxygen and Al having high affinity for the oxygen.

In addition, a ladle or the like used in steel-making process is often constructed by using an alumina-based refractory. Accordingly, even when the molten steel is deoxidized by using Si or Mn instead of Al, Al is dissolved in the molten steel due to reaction between the molten steel and the above refractory, the dissolved Al is reoxidized, and thereby, the alumina is formed in the molten steel. The alumina inclusions are hard and form a coarse alumina cluster by being agglomerated and combined, which causes a deterioration of the fatigue properties.

For decreasing and removing the alumina inclusions, the deoxidization products are mainly decreased by applying a secondary refining apparatus such as a RH (Ruhrstahl-Hausen) vacuum degassing apparatus or a powder injection apparatus. In addition, reoxidization is suppressed by shielding air or reforming slag, the oxides are prevented from mixing by slag cut, and a combination thereof is conducted for a decrease in the inclusions.

For example, a following producing method is known. In the producing method, when an Al-killed steel containing 0.005 mass % or more of Al is produced, the alumina in the formed inclusions is controlled to be in a range of 30 mass % to 85 mass % by adding alloy consisting of Al and at least two selected from Ca, Mg, and REM (Rare Earth Metal) into molten steel.

Patent Document 1 discloses technology of controlling the formed inclusions to be complex inclusions whose melting point is low by adding at least two selected from REM, Mg, and Ca to molten steel in order prevent the formation of the alumina cluster. Although the technology may be effective in preventing sliver defects, it is difficult to refine the size of the harmful inclusions to the required level for the bearing steel. This is because the inclusions are further coarsened by being agglomerated and combined when the inclusions are controlled to be the inclusions whose melting point is low.

In a case where REM is added, since REM makes the inclusions spheroidal, an effect in improving the fatigue properties is obtained. Although REM is added as necessary in order to control morphology of the inclusions as described above, addition of more than 0.010 mass % of REM results in an increase in the inclusions and a decrease in the fatigue life. For example, Patent Document 2 discloses the necessity to control REM content to be 0.010 mass % or less. However, Patent Document 2 does not disclose the mechanism or a composition and an existence condition of the inclusions.

The shape of sulfides such as MnS is elongated by plastic deformation such as forging. Thus, when repeated stress is applied, the sulfides accumulate the fatigue and act as a fracture origin, and thereby, the fatigue properties deteriorate. Accordingly, it is necessary to control the sulfides in order to improve the fatigue properties.

As a method of suppressing the formation of the sulfides, a method of desulfurization using Ca is known. However, Al—Ca—O complex oxides which are formed by adding Ca have problems such that the shape thereof tends to be elongated by the plastic deformation and that the complex oxides accumulate the fatigue and act as the fracture origin when the repeated stress is applied. In addition, the utilization of Ca is not effective in TiN.

Since the nitrides such as TiN are extremely hard and are precipitated with a sharp shape, the nitrides accumulate the fatigue and act as the fracture origin, and thereby, the fatigue properties deteriorate. For example, Patent Document 3 discloses that, when Ti is added exceeding 0.001 mass %, the fatigue properties deteriorate.

In order to suppress the formation of TiN, it is important to control Ti content to be 0.001 mass % or less. However, since Ti is also included in molten iron or slag, it is difficult to stably reduce the content. Thus, it is necessary to effectively remove Ti and N in the molten steel, but the production cost of the steel unpreferably increases.

As described above, the technology of controlling the harmful inclusions such as $Al_2O_3$, Al—Ca—O complex oxides, MnS, and TiN in order to improve the fatigue properties required as the bearing steel is not found at present.

RELATED ART DOCUMENTS

Patent Documents

[Patent Document 1] Japanese Unexamined Patent Application, First Publication No. H09-263820
[Patent Document 2] Japanese Unexamined Patent Application, First Publication No. H11-279695
[Patent Document 3] Japanese Unexamined Patent Application, First Publication No. 2004-277777

SUMMARY OF INVENTION

Technical Problem to be Solved

An object of an embodiment of the present invention is to provide a bearing steel in which the above problems in the related art are solved and which has excellent fatigue properties, and a method for producing the same.

Solution to Problem

As a result of experiments and studies in order to solve the above problems in the related art, the present inventors have found that, in order to control the formation and the morphology of the above harmful inclusions, it is possible to form complex inclusions including REM, Ca, O, S, and Al (hereinafter, referred to as REM-Ca—Al—O—S complex oxysulfides) in a metallographic structure of the bearing steel by adjusting each amount of chemical compositions such as REM, Al, and Ca and by controlling a deoxidization method and a method for producing the bearing steel.

Since $Al_2O_3$ and Al—Ca—O complex oxides are transformed into the REM-Ca—Al—O—S complex oxysulfides, it is possible to suppress the formation of coarse alumina cluster and to prevent the above complex oxides from being elongated and coarsened due to plastic deformation. Moreover, since the REM-Ca—Al—O—S complex oxysulfides fix S in the steel, it is possible to suppress the formation of coarse MnS. Furthermore, since TiN complexly precipitates on a surface of the REM-Ca—Al—O—S complex oxysulfides, it is possible to decrease a number of TiN existing independently.

An aspect of the present invention employs the following.

(1) A bearing steel according to an aspect of the invention includes, as a chemical composition, by mass %, C: 0.9% to 1.5%, Si: 0.1% to 0.8%, Mn: 0.1% to 1.5%, Cr: 0.5% to 2.0%, Al: 0.01% to 0.05%, Ca: 0.00001% to 0.0050%, Rare Earth Metal: 0.0001% to 0.050%, O: 0.0001% to 0.0030%, Ti: limited to less than 0.005%, N: limited to 0.015% or less, P: limited to 0.03% or less, S: limited to 0.05% or less, and a balance consisting of Fe and unavoidable impurities, and includes, as a metallographic structure, inclusions which contain complex oxysulfides including Rare Earth Metal, Ca, O, S, and Al, TiN, MnS, $Al_2O_3$, and complex oxides including Al and Ca, wherein, a number fraction of the complex oxysulfides in a total number of the inclusions is 50% to less than 100% and a number of complex oxysulfides having a major axis of 5 μm or more is 0.001 pieces to 2 pieces in an observed section of 1 $mm^2$, and a number of TiN existing independently from the complex oxysulfides and having a major axis of 5 μm or more is 0.001 pieces to less than 1.0 piece in the observed section of 1 $mm^2$.

(2) In the bearing steel according to (1), when the S content in the chemical composition is more than 0.01% to 0.05%, the Ca content may be 0.00050% to 0.0050%.

(3) The bearing steel according to (1) or (2) may further include, as the chemical composition, by mass %, at least one of V: 0.05% to 0.70%, Mo: 0.05% to 1.00%, W: 0.05% to 1.00%, Ni: 0.10% to 3.50%, Cu: 0.10% to 0.50%, Nb: 0.005% to less than 0.050%, and B: 0.0005% to 0.0050%.

(4) In the bearing steel according to any one of (1) to (3), an Al content in the complex oxysulfides may be 20 mass % or less in $Al_2O_3$ equivalent.

(5) In the bearing steel according to any one of (1) to (4), a total number of MnS having a major axis of 10 μm or more and the TiN existing independently from the complex oxysulfides and having the major axis of 5 μm or more may be 5 pieces or less in the observed section of 1 $mm^2$.

(6) In the bearing steel according to any one of (1) to (5), the Cu content and the Ni content expressed in mass % may satisfy Cu≤Ni.

(7) A method for producing a bearing steel according to an aspect of the invention includes: Al-deoxidizing a molten steel using Al; REM-deoxidizing the molten steel using Rare Earth Metal after the Al-deoxidizing for 5 minutes to 10 minutes; casting the molten steel after the REM-deoxidizing so as to obtain a cast piece which includes, as a chemical composition, by mass %, C: 0.9% to 1.5%, Si: 0.1% to 0.8%, Mn: 0.1% to 1.5%, Cr: 0.5% to 2.0%, Al: 0.01% to 0.05%, Ca: 0.00001% to 0.0050%, Rare Earth Metal: 0.0001% to 0.050%, O: 0.0001% to 0.0030%, Ti: limited to less than 0.005%, N: limited to 0.015% or less, P: limited to 0.03% or less, S: limited to 0.05% or less, and a balance consisting of Fe and unavoidable impurities; heating the cast piece in a temperature range of 1270° C. to 1300° C. and holding the cast piece after the heating in a temperature range of 1200° C. to 1250° C. for 60 seconds or more; and hot-plastic-working the cast piece after the heating and the holding so as to obtain a hot-worked steel.

(8) The method for producing the bearing steel according to (7) may further include vacuum-degassing the molten steel using Ca after the REM-deoxidizing and before the casting, when the molten steel includes, as a chemical composition, by mass %, S: more than 0.01% to 0.05%.

(9) In the method for producing the bearing steel according to (7) or (8), the cast piece may further include, as the chemical composition, by mass %, at least one of V: 0.05% to 0.70%, Mo: 0.05% to 1.00%, W: 0.05% to 1.00%, Ni: 0.10% to 3.50%, Cu: 0.10% to 0.50%, Nb: 0.005% to less than 0.050%, and B: 0.0005% to 0.0050%.

(10) In the method for producing the bearing steel according to any one of (7) to (9), in the casting, the molten steel may be cast while being rotated horizontally in a mold under a condition of 0.1 m/minute to 0.5 m/minute.

(11) The method for producing the bearing steel according to any one of (7) to (10) may further include soft-annealing the hot-worked steel after the hot-plastic-working by being heated in a temperature range of 700° C. to 750° C. and held for 30 hours to 50 hours so as to obtain a softened steel.

(12) The method for producing the bearing steel according to any one of (7) to (11) may further include fluxing the molten steel using CaO—$CaF_2$ for a desulfurization after the REM-deoxidizing and before the vacuum-degassing.

Effects of Invention

According to the above aspects of the bearing steel and the method for producing the same, since $Al_2O_3$ and Al—Ca—O complex oxides are transformed into the REM-Ca—Al—O—S complex oxysulfides, it is possible to suppress the formation of coarse alumina cluster and to prevent the complex oxides from being elongated and coarsened. Moreover, since the REM-Ca—Al—O—S complex oxysulfides fix S, it is possible to suppress the formation of coarse MnS. Furthermore, since the REM-Ca—Al—O—S complex oxysulfides complexly involve TiN, it is possible to decrease a number of TiN existing independently. As a result, it is possible to solve the above problems.

DETAILED DESCRIPTION OF PREFERRED EMBODIMENTS

Figure 1:
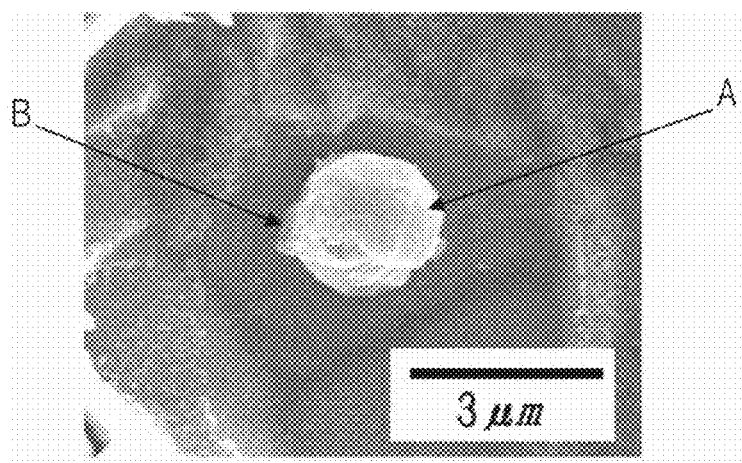
FIG. 1 is a metallographic micrograph of bearing steel according to an embodiment of the present invention.

Hereinafter, a preferable embodiment of the present invention will be described in detail.

First, limitation range and reasons for the limitation of base elements of the bearing steel according to an embodiment of the present invention will be described in detail. Herein, the described % is mass %.

Al: 0.01% to 0.05%

Al (aluminum) is a deoxidizing element and an element which is required to form REM-Ca—Al—O—S complex oxysulfides. In order to obtain the effects, the Al content needs to be 0.01% or more. However, when the Al content is more than 0.05%, $Al_2O_3$ and Al—Ca—O complex oxides do not transform into the REM-Ca—Al—O—S complex oxysulfides. The reason for the above seems that, when the Al content is more than 0.05%, the state of the $Al_2O_3$ and the Al—Ca—O complex oxides is more stable than that of the REM-Ca—Al—O—S complex oxysulfides.

$Al_2O_3$ is a hard oxide, and $Al_2O_3$ not only causes deterioration of fatigue properties but also drastically deteriorates durability of a refractory during casting. During continuous casting, the hard oxides adhere to nozzles, and thereby, may cause nozzle blockage. Although the Al—Ca—O complex oxides are not as hard as $Al_2O_3$, the size of the Al—Ca—O complex oxides is generally larger than that of $Al_2O_3$, and thereby, cause the deterioration of the fatigue properties. Accordingly, the upper limit of the Al content should be 0.05%.

REM: 0.0001% to 0.050%

REM (Rare Earth Metal) is a strong desulfurizing and deoxidizing element and is a significantly important element in order to obtain the sufficient effect of the aspect of the present invention. Here, REM represents collectively a total of 17 elements which are 15 elements from lanthanum with atomic number 57 to lutetium with atomic number 71 in addition to scandium with atomic number 21 and yttrium with atomic number 39.

When the REM content is less than 0.0001%, $Al_2O_3$ and the Al—Ca—O complex oxides which are not transformed into the REM-Ca—Al—O—S complex oxysulfides increase. Thus, coarse MnS is formed by S which is not combined with the REM-Ca—Al—O—S complex oxysulfides, and TiN increases which exists independently and which does not precipitate on a surface of the REM-Ca—Al—O—S complex oxysulfides.

When the REM content is more than 0.050%, a production cost increases, and productivity deteriorates because the nozzle blockage tends to occur during casting due to the formed REM-containing inclusions. Accordingly, the REM content should be 0.0001% to 0.050%. It is more preferable that the REM content is 0.0003% to 0.050%. It is still more preferable that the REM content is more than 0.001% to 0.050%. It is most preferable that the REM content is more than 0.003% to 0.050%.

C: 0.9% to 1.5%

C (carbon) is an element which improves the fatigue life by ensuring hardness in quenching and which enhances strength due to dispersion of spheroidal carbides and martensitic transformation of matrix. In order to obtain the effects, the C content needs to be 0.9% or more. However, when the C content is more than 1.5%, although wear resistance is enhanced, tool life decreases during cutting because the hardness of a base material excessively increases, and cracks may occur during quenching. Thus, the C content should be 0.9% to 1.5%. It is preferable that the lower limit of the C content is 1.0% and the upper limit thereof is 1.2%.

Si: 0.1% to 0.8%

Si (silicon) is an element which increases hardenability and which improves the fatigue life. In order to obtain the effects, the Si content needs to be 0.1% or more. However, when the Si content is more than 0.8%, the above effects are saturated, the tool life decreases during cutting because the hardness of the base material increases, and the cracks may occur during quenching. Thus, the Si content should be 0.1% to 0.8%. It is preferable that the lower limit of the Si content is 0.15% and the upper limit thereof is 0.7%.

Mn: 0.1% to 1.5%

Mn (manganese) is an element which increases the strength by increasing the hardenability and improves the fatigue life. In order to obtain the effects, the Mn content needs to be 0.1% or more. However, when the Mn content is more than 1.5%, the effect in increasing the hardenability is saturated. Moreover, the tool life decreases during cutting because the hardness of the base material increases and the cracks may occur during quenching. Thus, the Mn content should be 0.1% to 1.5%. It is preferable that the lower limit of the Mn content is 0.2% and the upper limit thereof is 1.15%. It is most preferable that the lower limit of the Mn content is more than 0.5% and the upper limit thereof is 1.15%.

Cr: 0.5% to 2.0%

Cr (chromium) is an element which increases the hardenability and improves the fatigue life. In order to obtain the effects, the Cr content needs to be 0.5% or more. However, when the Cr content is more than 2.0%, the above effects are saturated. Moreover, the tool life decreases during cutting because the hardness of the base material increases and the cracks may occur during quenching. Thus, the Cr content should be 0.5% to 2.0%. It is preferable that the lower limit of the Cr content is 0.9% and the upper limit thereof is 1.6%. It is most preferable that the lower limit of the Cr content is more than 1.0% and the upper limit thereof is less than 1.6%.

Ca: 0.00001% to 0.0050%

Ca (calcium) is a deoxidizing and desulfurizing element. Ca has a function of softening oxides. It is known that, when Ca is added to free cutting steel, an oxide film called Belag is formed due to cutting heat during the cutting, the film covers and protects the surface of a tool, and thereby, the life of the cutting tool is prolonged.

Moreover, Ca is an element which is required to form the REM-Ca—Al—O—S complex oxysulfides. Since the REM-Ca—Al—O—S complex oxysulfides fix S, the formation of the coarse MnS is suppressed. However, when the Ca content is less than 0.00001%, the REM-Ca—Al—O—S complex oxysulfides are not formed, but REM-Al—O—S complex oxysulfides which do not include Ca are formed.

The REM-Al—O—S complex oxysulfides which do not include Ca have a small effect in fixing S. In order to enhance the effect in fixing S, it is necessary to form REM-Ca—Al—O—S complex oxysulfides including Ca and REM. Thus, the Ca content needs to be 0.00001% or more. It is preferable that the lower limit of the Ca content is 0.00010%. It is more preferable that the lower limit of the Ca content is 0.00050%. In order to detect the Ca content which is a level of 0.00001% in the steel, high sensitivity element spectrometry such as ICP-AES (inductively coupled plasma-atomic emission spectrometry), ICP-MS (inductively coupled plasma-mass spectrometry), or the like may be used as necessary.

In general, even when Ca is not purposely added, steel unavoidably contains approximately 0.0001% of Ca. The above mentioned Ca which is unavoidably contained also has an effect in forming the REM-Ca—Al—O—S complex oxysulfides. Accordingly, in a case where Ca unavoidably contained in the steel is 0.00001% or more, Ca may not be purposely added thereto. The REM-Ca—Al—O—S complex oxysulfides which are formed using Ca unavoidably contained in the steel have the effect in fixing S.

Since the number of inclusions which is observed in a polished surface of the bearing steel which is basically cleanliness steel is small, it is possible to directly analyze the composition of the inclusions (REM-Ca—Al—O—S complex oxysulfides, $Al_2O_3$, Al—Ca—O complex oxides, MnS, TiN, or the like) by using a scanning electron microscope (SEM) provided with EPMA (electron probe micro analysis) or EDX (energy dispersive X-Ray analysis). In other words, it is possible to confirm the formation of the REM-Ca—Al—O—S complex oxysulfides because existence of Al, Ca, or S in the inclusions is analyzed for each of the inclusions by using an X-ray signal when an electron beam is applied thereto. Moreover, it is possible to semi-quantitatively calculate the composition from the signal intensity. In addition, the composition may be directly analyzed by using TEM (Transmission Electron Microscope) provided with EDX or the like as necessary. The present inventors have used various raw materials (cast piece) including a high purity raw material in which the Ca content is less than 0.00001% and have investigated the lower limit of Ca for forming the REM-Ca—Al—O—S complex oxysulfides by using the above analysis method. As a result, it has been found that, when the Ca content in the steel (cast piece) is 0.00001% or more, the REM-Ca—Al—O—S complex oxysulfides are formed as inclusions instead of the REM-Al—O—S complex oxysulfides which do not include Ca as described above.

In order to increase the effect in fixing S in respect to the REM-Ca—Al—O—S complex oxysulfides, it is preferable to purposely add Ca to the steel. For example, it is preferable to purposely add Ca to the steel in a case where S content is high and the effect in fixing S in respect to the REM-Ca—Al—O—S complex oxysulfides should be further increased. Specifically, when the S content is more than 0.01% to 0.05%, it is preferable to purposely add Ca to the steel so that the Ca content is 0.00050% to 0.0050%. As a result, even when the S content is high such as more than 0.01% to 0.05%, the effect in fixing S in respect to the REM-Ca—Al—O—S complex oxysulfides is sufficiently increased, and the precipitation of MnS is sufficiently suppressed.

When the Ca content is more than 0.0050%, the Al—Ca—O complex oxides and CaO which are coarse oxides are excessively formed, and thereby, the fatigue life is shortened. In particular, the size of the Al—Ca—O complex oxides obtained by complexing Ca with $Al_2O_3$ is generally larger than that of $Al_2O_3$, and thereby, the Al—Ca—O complex oxides cause the deterioration of the fatigue properties. Therefore, the upper limit of the Ca content should be 0.0050% or less. In addition, Ca is solid-soluted in the REM-Ca—Al—O—S complex oxysulfides and CaS does not independently exist.

O: 0.0001% to 0.0030%

Although O (oxygen) is an element which should be removed from the steel through the deoxidization, O is an element which is required to precipitate the REM-Ca—Al—O—S complex oxysulfides. In order to obtain the effect, the O content needs to be 0.0001% or more. However, when the O content is more than 0.0030%, oxides excessively remain, and thereby the fatigue life deteriorates. Therefore, the upper limit of the O content should be 0.0030% or less. In addition, the above O content indicates the total oxygen (T.O) whose content is the amount of the solid-soluted oxygen in the steel and the oxygen included in the REM-Ca—Al—O—S complex oxysulfides, $Al_2O_3$ or the like.

The bearing steel according to the embodiment includes unavoidable impurities in addition to the above described base elements. Herein, the unavoidable impurities indicate elements such as Ti, N, P, S, Mg, Pb, Sb, Sn, Cd, or the like which are unavoidably mixed from auxiliary materials such as scrap or from producing processes. In the elements, Ti, N, P, and S are limited to the following in order to sufficiently obtain the effects of the aspect of the present invention. Herein, the described % is mass %. In addition, although the limitation range of the impurities includes 0%, it is industrially difficult for the level of impurities to stably be 0%.

Ti: less than 0.005%

Ti (titanium) is an impurity and an element which forms fine inclusions such as TiC, TiN, and TiS and which deteriorates the fatigue properties. In particular, since TiN is precipitated in an angular shape, stress tends to be concentrated at TiN, and thereby, to act as the fracture origin when the repeated stress is applied. Accordingly, it is significantly important to suppress the amount of TiN precipitated in the angular shape.

Figure 2:
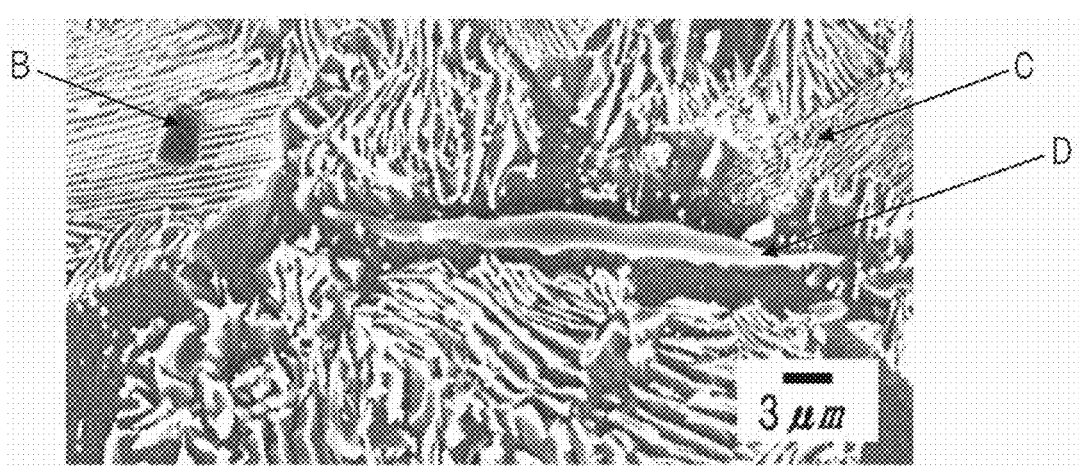
FIG. 2 is a metallographic micrograph of bearing steel according to a related art.

In a case where the REM-Ca—Al—O—S complex oxysulfides exist in the metallographic structure, TiN complexly precipitates on the REM-Ca—Al—O—S complex oxysulfides which act as preferential nucleation sites. Thus, the REM-Ca—Al—O—S complex oxysulfides become REM-Ca—Al—O—S—TiN complex oxysulfide having an approximately spherical shape as shown in FIG. 1. As a result, independent precipitation of TiN, which is hard and has the sharp and angular shape as shown B in FIG. 2, is suppressed. The metallographic structure will be described in detail later.

It is necessary to limit the Ti content to be less than 0.005% in order to complexly precipitate TiN on the REM-Ca—Al—O—S complex oxysulfides and to decrease the amount of TiN precipitates existing independently. In the related art, it is necessary to limit the Ti content to be 0.001% or less in order to suppress the deterioration of the fatigue properties due to TiN. However, in the aspect of the present invention, in so far as the Ti content is less than 0.005%, the acceptable fatigue properties are obtained by the effect of the REM-Ca—Al—O—S complex oxysulfides even when Ti content more than the level in the related art is included. As described above, it is possible to produce the bearing steel which stably shows the excellent fatigue properties in so far as the Ti content is limited to less than 0.005%.

Since it is preferable that the Ti content is as small as possible in order to decrease the amount of TiN precipitates, the limitation range includes 0%. However, it is not easy to technically control the Ti content to be 0%, and the production cost of the steel increases in order to stably control the Ti content to be 0.0002% or less. Therefore, it is preferable that the limitation range of the Ti content is more than 0.0002% to less than 0.005%. For the production cost, it is more preferable that the limitation range of the Ti content is more than 0.001% to less than 0.005%. Generally, in ordinary producing condition, approximately 0.003% of Ti is unavoidably contained.

N: 0.015% or less

N (nitrogen) is an impurity and an element which deteriorates the fatigue properties by forming nitrides and which negatively influence ductility and toughness due to strain aging. When the N content is more than 0.015%, the above harmful influence is unacceptable. Therefore, the N content is limited to 0.015% or less.

Since it is preferable that the N content is as small as possible in order to decrease the amount of nitrides, the limitation range includes 0%. However, it is not easy to technically control the N content to be 0%, and the production cost of the steel increases in order to stably control the N content to be less than 0.0008%. Therefore, it is preferable that the limitation range of the N content is 0.0008% to 0.015%. It is more preferable that the limitation range of the N content is 0.0008% to 0.010%.

P: 0.03% or less

P (phosphorus) is an impurity, and an element which segregates to grain boundaries and which shortens the fatigue life. When the P content is more than 0.03%, the decrease in the fatigue life is unacceptable. Accordingly, the P content is limited to 0.03% or less.

Since it is preferable that the P content is as small as possible in order to suppress the decrease in the fatigue life, the limitation range includes 0%. However, it is not easy to technically control the P content to be 0%, and the production cost of the steel increases in order to stably control the P content to be less than 0.0005%. Therefore, it is preferable that the limitation range of the P content is 0.0005% to 0.03%. It is more preferable that the limitation range of the P content is 0.0005% to 0.02%.

S: 0.05% or less

S (sulfur) is an impurity, and an element which forms sulfides. When the S content is more than 0.05%, the effect in fixing S obtained by REM and Ca included in the REM-Ca—Al—O—S complex oxysulfides is insufficient, coarse MnS as shown by D in FIG. 2 is formed, and thereby, the fatigue life deteriorates. Therefore, the S content needs to be limited to 0.05% or less.

Since it is preferable that the S content is as small as possible in order to suppress the precipitation of MnS, the limitation range includes 0%. However, it is not easy to technically control the S content to be 0%, and the production cost of the steel increases in order to stably control the S content to be 0.0003% or less. Therefore, it is preferable that the limitation range of the S content is more than 0.0003% to 0.05%. In addition, since S has a function of increasing machinability, the machinability is improved when the S content is 0.005% or more. Thus, in a case where the machinability is regarded as important, the limitation range of the S content may be 0.005% to 0.05%.

When the S content is 0.05% or less and the Ca content which is unavoidably contained is 0.00001% or more, it is possible to suppress the amount of MnS precipitates within an acceptable range by the effect in fixing S derived from the REM-Ca—Al—O—S complex oxysulfides. In the case, Ca may not be purposely added. However, in order to further increase the effect in fixing S, it is preferable to purposely add Ca. When the S content is higher within the limitation range, specifically, when the S content is more than 0.01% to 0.05%, it is preferable that the Ca content is controlled to be 0.00050% to 0.0050% by adding Ca. As a result, it is possible to preferably increase the effect in fixing S obtained by the REM-Ca—Al—O—S complex oxysulfides and to preferably suppress the precipitation of MnS.

In addition, although the effect in fixing S derived from the REM-Ca—Al—O—S complex oxysulfides is obtained by REM and Ca, REM may cause the nozzle blockage or the like during casting, and therefore, it is difficult to add REM whose content is more than the above described upper limit. Accordingly, it is preferable to control the effect in fixing S by the Ca content.

The above are the base elements (base components) of the steel in the embodiment. The above base elements are included or controlled and the balance consists of Fe and unavoidable impurities. However, in the embodiment, in addition to the base elements, the following optional elements may be additionally included in the steel instead of a part of Fe which is the balance as necessary. Moreover, even when the optional elements whose content is less than a lower limit of each optional element are unavoidably included in the steel, the effects in the embodiment are not decreased.

Specifically, the bearing steel according to the embodiment may further include, as an optional element, at least one selected from the group consisting of V, Mo, W, Ni, Cu, Nb, and B. Hereinafter, limitation range and reasons for the limitation of the optional elements will be described. Here, the described % is mass %.

V: 0.05% to 0.70%

V is an element which forms carbides, nitrides, and carbon-nitrides. Addition of V results in the formation of the fine carbides, nitrides, and carbon-nitrides of V having an equivalent circle diameter of less than 0.2 μm, and thereby, it is possible to obtain the effect of improving temper softening resistance, of increasing a yield point, of refining prior-austenite, or the like. It is possible to increase the hardness and the tensile strength by sufficient precipitation of the above precipitates resulted from increasing the V content and prolonging the tempering time.

In order to obtain the effects, it is preferable that the V content is 0.05% to 0.70%. When the V content is less than 0.05%, the above effects are not obtained. It is more preferable that the lower limit of the V content is 0.10%. Moreover, even when V whose content is less than the lower limit is contained in the steel, the effects in the embodiment are not decreased. Moreover, since it is not necessary to purposely add the optional element to the steel in order to reduce costs of alloy, the lower limit may be 0%.

When the V content is more than 0.70%, the coarse spheroidal carbides may not be sufficiently dissolved by heating before quenching, the so-called undissolved carbides may remain, and thereby, the workability or the fatigue properties may deteriorate. In addition, by adding V, a supercooled structure which causes the cracks before working or the wire breakage during wire drawing tends to be formed. Accordingly, it is preferable that the upper limit of the V content is 0.70%. In a case where a decrease in quality unevenness and an increase in production stability at producing the bearings are regarded as important, the upper limit of the V content is preferably 0.50%, and more preferably 0.30%.

Mo: 0.05% to 1.00%

Mo is an element which increases the hardenability and improves the temper softening resistance. In addition, Mo is an element which forms Mo-containing carbides in the steel. In order to obtain the effects, it is preferable that the Mo content is 0.05% to 1.00%.

The temperature in which the Mo-containing carbides precipitate is lower than that of V-containing carbides or the like. The Mo-containing carbides are effective in improving the above properties for the bearing steel which is tempered at a lower temperature. Accordingly, it is preferable that the lower limit of the Mo content is 0.05%. It is more preferable that the lower limit of the Mo content is 0.10%. Moreover, even when Mo whose content is less than the lower limit is contained in the steel, the effects in the embodiment are not decreased. Moreover, since it is not necessary to purposely add the optional element to the steel in order to reduce costs of alloy, the lower limit may be 0%.

When the Mo content is more than 1.00%, the supercooled structure tends to be formed during cooling after hot rolling or cooling after heat treatment before working. The supercooled structure causes season cracks or cracks during working. Therefore, it is preferable that the upper limit of the Mo content is 1.00%. It is more preferable that the upper limit of the Mo content is 0.50%.

In order to decrease in quality unevenness and to increase in production stability at producing the bearings, it is preferable that the upper limit of the Mo content is 0.20%. Furthermore, in order to stabilize shape accuracy by precisely controlling the transformation strain caused by temperature variation during cooling, it is preferable that the upper limit of the Mo content is 0.15%.

W: 0.05% to 1.00%

W is an element which increases the hardenability and improves the temper softening resistance in common with Mo. Moreover, W is an element which precipitates as carbides in the steel. In order to obtain the effects, it is preferable that the W content is 0.05% to 1.00%. It is more preferable that the lower limit of the W content is 0.10%. Moreover, even when W whose content is less than the lower limit is contained in the steel, the effects in the embodiment are not decreased. Moreover, since it is not necessary to purposely add the optional element to the steel in order to reduce costs of alloy, the lower limit may be 0%.

On the other hand, when the W content is more than 1.00%, the supercooled structure tends to be formed during cooling after hot rolling or cooling after heat treatment before working in common with Mo. Accordingly, it is preferable that the upper limit of the W content is 1.00%. It is more preferable that the upper limit of the W content is 0.50%.

In order to decrease in quality unevenness and to increase in production stability at producing the bearings, it is preferable that the upper limit of the W content is 0.20%. Furthermore, in order to stabilize shape accuracy by precisely controlling the transformation strain caused by temperature variation during cooling, it is preferable that the upper limit of the W content is 0.15%.

Ni: 0.10% to 3.50%

Ni is an element which strengthens the steel. In order to obtain the effect, it is preferable that the Ni content is 0.10% to 3.50%. When the Ni content is less than 0.10%, it is difficult to obtain the above effect. Accordingly, it is preferable that the lower limit of the Ni content is 0.10%. It is more preferable that the lower limit of the Ni content is 0.20%. Moreover, even when Ni whose content is less than the lower limit is contained in the steel, the effects in the embodiment are not decreased. Moreover, since it is not necessary to purposely add the optional element to the steel in order to reduce costs of alloy, the lower limit may be 0%.

On the other hand, when the Ni content is more than 3.50%, a fraction of retained austenite increases. As a result, the steel may not be hardened even if the quenching is performed, and therefore, the hardness required as the bearing steel may not be satisfied. In addition, in the bearings including a large amount of the retained austenite, the shape accuracy of bearing products may deteriorate with the usage thereof because the martensitic transformation with transformation expansion occurs. Accordingly, it is preferable that the upper limit of the Ni content is 3.50%.

Since Ni is an expensive element, it is preferable that the upper limit of the Ni content is 2.50% in order to reduce the production cost. It is more preferable that the upper limit of the Ni content is 1.00%.

Ni is also an element which suppresses harmful influence of Cu when Ni coexists with Cu. Cu may cause a decrease in hot ductility of the steel and occurrence of the cracks or flaws during hot rolling or hot forging. However, when Cu and Ni are simultaneously added, Cu and Ni form an alloy phase, and thereby, the decrease in the hot ductility is suppressed. Therefore, it is preferable that Ni is added when Cu exists in the steel. It is preferable that the Ni content is within the above range and that the Cu and Ni contents expressed in mass % satisfy Cu≤Ni.

Cu: 0.10% to 0.50%

Cu is an element which improves corrosion resistance and suppresses decarburization. In order to obtain the effects, it is preferable that the Cu content is 0.10% to 0.50%. When the Cu content is less than 0.10%, it is difficult to obtain the above effects. Accordingly, it is preferable that the lower limit of the Cu content is 0.10%. It is more preferable that the lower limit of the Cu content is 0.20%. Moreover, even when Cu whose content is less than the lower limit is contained in the steel, the effects in the embodiment are not decreased. Moreover, since it is not necessary to purposely add the optional element to the steel in order to reduce costs of alloy, the lower limit may be 0%.

On the other hand, when the Cu content is more than 0.50%, the hot ductility may deteriorate, which may cause the occurrence of the cracks or the flaws in the producing processes such as casting, rolling, and forging. Accordingly, it is preferable that the upper limit of the Cu content is 0.50%. It is more preferable that the upper limit of the Cu content is 0.40%. In addition, as described above, it is preferable that the Cu content is within the above range and that the Cu and Ni contents expressed in mass % satisfy Cu≤Ni. As a result, since the decrease in the hot ductility is suppressed, it is possible to satisfactorily maintain the quality of the bearing steel.

Nb: 0.005% to less than 0.050%

Nb is an element which bonds to C and N in the steel and forms carbides, nitrides, and carbonitrides. Even when a small amount of Nb is added, it is possible to obtain an effect in suppressing grain coarsening as compared with a case where Nb is not added. Furthermore, in a case where Nb is added in combination with an element such as V which forms carbides, nitrides and carbonitrides, since Nb tends to form the nitrides as compared with V, V may not form the nitrides. As a result, it is possible to obtain an effect in which V-containing carbides effective in refining the grain size of the austenite tends to be formed. As described above, even when the small amount of Nb is added, it is possible to more effectively control the grain size of the austenite or impart the temper softening resistance.

In order to obtain the effects, it is preferable that the Nb content is 0.005% to less than 0.050%. When the Nb content is less than 0.005%, it is difficult to obtain the above effects. Accordingly, it is preferable that the lower limit of the Nb content is 0.005%. It is more preferable that the lower limit of the Nb content is 0.010%. Moreover, even when Nb whose content is less than the lower limit is contained in the steel, the effects in the embodiment are not decreased.

Moreover, since it is not necessary to purposely add the optional element to the steel in order to reduce costs of alloy, the lower limit may be 0%.

On the other hand, Nb is an element which decreases the hot ductility. When the Nb content is 0.050% or more, Nb may cause the occurrence of the cracks or the flaws in the producing processes such as casting, rolling, and forging, and the productivity may excessively deteriorate. Accordingly, it is preferable that the upper limit of the Nb content is less than 0.050%. In a case where cold workability or machinability is regarded as important, it is preferable that the upper limit of the Nb content is 0.030%. It is more preferable that the upper limit of the Nb content is 0.020%. In a case where Nb is added in combination with elements such as V which increase the hardenability and improve the temper softening resistance, the upper limit of the Nb content may be 0.010%.

B: 0.0005% to 0.0050%

B is an element which increases the hardenability of the steel with a small amount of addition. Moreover, B is an element which forms carbides containing B and Fe during cooling after hot rolling, increases the growth rate of ferrite, and improves the workability of the steel, in a case where the base material is a high carbon steel. Furthermore, by the segregation to austenite grain boundary of B itself, B suppresses the grain boundary segregation of P, and improves the strength of grain boundary. As a result, B is an element which improves grain boundary strength and which increases the fatigue strength and impact strength.

In order to obtain the effects, it is preferable that the B content is 0.0005% to 0.0050%. When the B content is less than 0.0005%, the effects may not be obtained. Accordingly, it is preferable that the lower limit of the B content is 0.0005%. It is more preferable that the lower limit of the B content is 0.0010%. Moreover, even when B whose content is less than the lower limit is contained in the steel, the effects in the embodiment are not decreased. Moreover, since it is not necessary to purposely add the optional element to the steel in order to reduce costs of alloy, the lower limit may be 0%.

On the other hand, when the B content is more than 0.0050%, the above effects are saturated. In addition, the supercooled structure such as martensite or bainite tends to be formed in the producing processes such as casting, rolling, and forging, and thereby, the productivity or the impact strength of products may deteriorate. Accordingly, it is preferable that the upper limit of the B content is 0.0050%. It is more preferable that the upper limit of the B content is 0.0030%.

Next, the metallographic structure of the bearing steel according to the embodiment will be described.

As described above, the metallographic structure of the bearing steel according to the embodiment includes the complex oxysulfides including Rare Earth Metal, Ca, O, S, and Al (REM-Ca—Al—O—S complex oxysulfides), $Al_2O_3$, the complex oxides including Al and Ca (Al—Ca—O complex oxides), MnS, TiN, and other inclusions. In addition, TiN preferentially precipitates on the REM-Ca—Al—O—S complex oxysulfides, and thereby, REM-Ca—Al—O—S—TiN complex oxysulfides are formed. Here, TiN in the REM-Ca—Al—O—S—TiN complex oxysulfides represents TiN which complexly precipitates on the surface of the REM-Ca—Al—O—S complex oxysulfides.

REM added to the steel reacts with and deoxidizes $Al_2O_3$ and Al—Ca—O complex oxides in the steel in order to form REM oxides. Subsequently, the REM oxides react with Ca which is unavoidably contained in the steel or Ca which is added as necessary in order to form REM complex oxides. The REM complex oxides react with S which is the impurity included in the steel in order to form REM-Ca—Al—O—S complex oxysulfides including REM, Ca, O, S, and Al. TiN preferentially precipitates on the surface of the REM-Ca—Al—O—S complex oxysulfides.

The REM-Ca—Al—O—S complex oxysulfides show the following effects. It is possible to prevent the oxides such as $Al_2O_3$ and Al—Ca—O complex oxides from remaining in the metallographic structure, to prevent MnS which is coarse sulfides from being formed, and to prevent TiN which is nitrides from existing independently. As a result, the fatigue properties of the bearing steel are improved.

As shown in FIG. 1, the REM-Ca—Al—O—S complex oxysulfides have the approximately spherical shape, and therefore, it is difficult to be elongated or fractured by plastic deformation such as forging. Accordingly, even when the repeated stress is applied, it is difficult to act as the fracture origin. Here, the approximately spherical shape indicates that maximum difference between a concave and a convex of the surface of the inclusions is 0.5 μm or less or that a value calculated by dividing a major axis by a minor axis of the inclusions is 3 or less, as shown in FIG. 1.

In order to obtain the effects, in the metallographic structure, it is necessary that a number fraction of the REM-Ca—Al—O—S complex oxysulfides is 50% to less than 100% in a total number of the inclusions such as $Al_2O_3$, Al—Ca—O complex oxides, MnS, and TiN. When the number fraction of the REM-Ca—Al—O—S complex oxysulfides is less than 50%, it is difficult to obtain the effect in improving the fatigue properties of the bearing steel. In addition, it is substantially difficult to control the number fraction of the REM-Ca—Al—O—S complex oxysulfides to be 100%. It is more preferable that the number fraction of the REM-Ca—Al—O—S complex oxysulfides is 60% to less than 100%. In addition, for example, the number fraction may be obtained by mainly considering the inclusions having a major axis of 1 μm or more.

In addition, in order to obtain the effects, it is necessary that a number of REM-Ca—Al—O—S complex oxysulfides having a major axis of 5 μm or more is 0.001 pieces to 2 pieces in an observed section of 1 $mm^2$. Here, the REM-Ca—Al—O—S complex oxysulfides having a major axis less than 5 μm is excluded from the consideration of the number because the existence thereof is harmless in a case where the oxygen content and the sulfur content are within a determined range.

When the number of the REM-Ca—Al—O—S complex oxysulfides having the major axis of 5 μM or more is less than 0.001 pieces, it is difficult to sufficiently obtain the effect in suppressing the harmful inclusions such as $Al_2O_3$, Al—Ca—O complex oxides, MnS, and TiN. In addition, when the number of the REM-Ca—Al—O—S complex oxysulfides having the major axis of 5 μm or more is more than 2 pieces in an observed section of 1 $mm^2$, the effects are saturated and the fatigue properties deteriorates due to the excessive amount of precipitates. It is more preferable that the number of the REM-Ca—Al—O—S complex oxysulfides having the major axis of 5 μm or more is 0.001 pieces to 1.5 pieces in the observed section of 1 $mm^2$.

In addition, in order to reliably improve the fatigue properties of the bearing steel, it is necessary to decrease a number of TiN which exists independently from the REM-Ca—Al—O—S complex oxysulfides and which acts as the fracture origin when the repeated stress is applied. Specifically, it is necessary that the number of TiN is 0.001 pieces to less than 1.0 piece in the observed section of 1 $mm^2$, which exists independently from the REM-Ca—Al—O—S complex oxysulfides and having a major axis of 5 μm or more.

When the number of TiN existing independently from the REM-Ca—Al—O—S complex oxysulfides is 1.0 piece or more in the observed section of 1 mm², it is difficult to sufficiently obtain the effect in improving the fatigue properties of the bearing steel. In order to optimally improve the fatigue properties of the bearing steel, it is preferable that the number of TiN existing independently from the REM-Ca—Al—O—S complex oxysulfides is as small as possible. However, it is substantially difficult to control the number of TiN to be less than 0.001 pieces. Accordingly, the number of TiN existing independently from the REM-Ca—Al—O—S complex oxysulfides should be 0.001 pieces to less than 1.0 piece in the observed section of 1 mm². The number of TiN existing independently from the complex oxysulfides is preferably 0.001 pieces to 0.7 pieces and is more preferably 0.001 pieces to 0.5 pieces in the observed section of 1 mm².

The number of inclusions such as the REM-Ca—Al—O—S complex oxysulfides, $Al_2O_3$, the Al—Ca—O complex oxides, MnS, and TiN can be measured by using a scanning electron microscope (SEM) provided with EPMA (electron probe micro analysis) or EDX (energy dispersive X-Ray analysis), a transmission electron microscope (TEM), or the like.

The existence of the inclusions may be confirmed by observing a cross-section which is orthogonal to an extending direction of the bearing steel using the microscope, and the type of inclusions may be identified by conducting a composition analysis using EPMA or EDX. When the shape of the bearing steel is a round bar and when the radius of the observing section (cross-section perpendicular to the longitudinal direction) is r in unit of mm, it is preferable to averagely observe an observing area which is from the surface of the bearing steel (hot-worked steel) to the depth of ½r, for example. An observing magnification may be higher than or equal to the magnification in which the inclusions having a major axis of 1 μm or more can be distinguished. In addition, it is preferable to observe plural visual fields so that the observed area in total is at least 1000 mm². Thereby, the number fraction and the number of each inclusion existing in the observed section of 1 mm² may be obtained.

In addition, it is preferable that an Al content in the REM-Ca—Al—O—S complex oxysulfides is 20 mass % or less in $Al_2O_3$ equivalent. In other words, it is preferable that the Al content in the REM-Ca—Al—O—S complex oxysulfides is 10.6 mass % or less in Al equivalent. Because it may be possible to shift the melting point of the REM-Ca—Al—O—S complex oxysulfides to higher than the melting point of molten steel, and thereby, the REM-Ca—Al—O—S complex oxysulfides may be changed into hard inclusions. In the inclusions having a higher melting point than that of molten steel, the hardness thereof is generally higher.

In order to reliably increase the melting point of the inclusions to higher than the melting point of the molten steel and to change the inclusions into the hard inclusions, it is preferable that the Al content in the REM-Ca—Al—O—S complex oxysulfides is 10 mass % or less in $Al_2O_3$ equivalent. It is most preferable that the Al content in the REM-Ca—Al—O—S complex oxysulfides is 5 mass % or less in $Al_2O_3$ equivalent. In addition, in order to preferentially precipitate TiN on the REM-Ca—Al—O—S complex oxysulfides, it is preferable that the Al content in the above inclusions is 1 mass % or more in $Al_2O_3$ equivalent.

As described above, TiN complexly precipitates on the surface of the REM-Ca—Al—O—S complex oxysulfides which act as the preferential nucleation sites. Thus, the REM-Ca—Al—O—S—TiN complex oxysulfides are formed. As a result, precipitation of TiN which is hard and has the sharp angular shape independently precipitates is suppressed.

As shown in FIG. 1, the REM-Ca—Al—O—S—TiN complex oxysulfides have the approximately spherical shape and are the harmless inclusions which hardly act as the fracture origin. The reason why TiN complexly precipitates on the REM-Ca—Al—O—S complex oxysulfides which act as the preferential nucleation sites seems that the crystal structure of the REM-Ca—Al—O—S complex oxysulfides is similar to the crystal structure of TiN.

The above REM-Ca—Al—O—S complex oxysulfides do not include Ti as oxides. The reason for the above seems that, since the large amount of C, for example 0.9% to 1.5% of C, is contained, the level of oxygen during deoxidization is low, and therefore Ti oxides is hardly formed. In addition, from the circumstantial fact that the REM-Ca—Al—O—S complex oxysulfides do not include Ti as oxides, it is deduced that the crystal structure of the REM-Ca—Al—O—S complex oxysulfides is similar to the crystal structure of TiN.

In general, the Al—Ca—O complex oxides are formed in the metallographic structure of the steel when the steel simultaneously contains Al and Ca. However, the Al—Ca—O complex oxides are also transformed to the REM-Ca—Al—O—S complex oxysulfides by adding REM, and the melting point thereof is shifted to higher. Therefore, it is possible to prevent the Al—Ca—O complex oxides from being elongated and coarsened by plastic deformation. Since Ca is added as necessary to the molten steel after REM is added, it is difficult to form Ca-based sulfides such as CaS, Ca—Mn—S, or the like. The production method will be described later in detail.

As described above, since the REM-Ca—Al—O—S complex oxysulfides fix S, the formation of the coarse MnS is suppressed. Moreover, since the REM-Ca—Al—O—S complex oxysulfides complexly involve TiN, the number of TiN precipitating independently in the metallographic structure decreases. As a result, the fatigue properties are improved. Although it is preferable as ideal that the amount of MnS precipitates and the amount of TiN precipitates existing independently from the REM-Ca—Al—O—S complex oxysulfides are small in the metallographic structure of the bearing steel according to the embodiment, it is unnecessary to decrease the amount thereof to zero.

In order to reliably satisfy the fatigue properties required as the bearing steel, it is preferable that the amount of MnS and TiN precipitates which exist independently from the REM-Ca—Al—O—S complex oxysulfides in the metallographic structure satisfy the following condition. A total number of MnS having a major axis of 10 μm or more and the TiN existing independently from the REM-Ca—Al—O—S complex oxysulfides and having the major axis of 5 μm or more is preferably 5 pieces or less in the observed section of 1 mm².

Since the elongated MnS having the major axis of 10 μm or more may act as the fracture origin when the repeated stress is applied, and thereby, the fatigue life is negatively influenced. Since all of elongated MnS element having the major axis of 10 μm or more negatively influence the fatigue life, the upper limit of the major axis may not be limited. Similarly, since TiN which exists independently from the REM-Ca—Al—O—S complex oxysulfides and which has the major axis of 5 µm or more acts as the fracture origin due to the angular shape thereof, and thereby, the fatigue life is negatively influenced. Since all of TiN having the major axis of 5 µm or more negatively influence the fatigue life, the upper limit of the major axis may not be limited.

Figure 3:
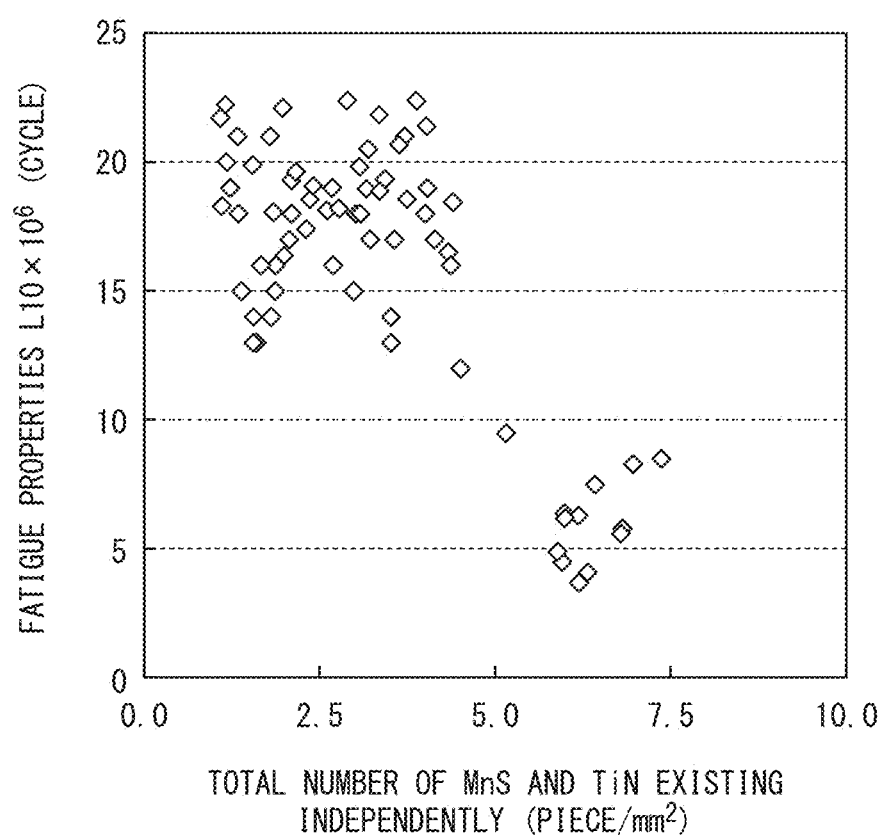
FIG. 3 is a relationship between fatigue properties of a bearing steel and a total number of MnS having a major axis of 10 μm or more and TiN existing independently from REM-Ca—Al—O—S complex oxysulfides and having a major axis of 5 μm or more.

FIG. 3 shows a relationship between the fatigue properties (L10 fatigue life) of the bearing steel and the total number of MnS having the major axis of 10 µm or more and TiN existing independently from the REM-Ca—Al—O—S complex oxysulfides and having the major axis of 5 µm or more (total number of MnS and TiN existing independently).

As shown in FIG. 3, when the number of MnS and the number of TiN is more than 5 pieces in total in the observed section of 1 mm², the fatigue properties of the bearing steel deteriorate. Accordingly, it is preferable that the total number of MnS and TiN is controlled to the above range. It is more preferable that the above total number is 4 pieces or less in the observed section of 1 mm². It is most preferable that the above total number is 3 pieces or less in the observed section of 1 mm². In addition, the lower limit of the above total number of MnS and TiN may be more than 0.001 pieces.

As described above, since $Al_2O_3$ and the Al—Ca—O complex oxides which are the harmful inclusions negatively influencing the fatigue properties of the bearing steel are mostly transformed to the REM-Ca—Al—O—S complex oxysulfides by the effect derived from the added REM, and therefore, the existing amount decreases. In addition, the amount of MnS precipitates which is the harmful inclusions is suppressed by the effect derived from the desulfurization of REM and Ca included in the REM-Ca—Al—O—S complex oxysulfides, in particular, by the effect derived from the desulfurization of Ca. Furthermore, since TiN which is the harmful inclusion preferentially precipitates on the surface of the REM-Ca—Al—O—S complex oxysulfides, the amount of TiN precipitating independently decreases. As a result, it is possible to obtain the bearing steel which is excellent in the fatigue properties.

Next, a method for producing the bearing steel according to the embodiment will be described.

In the method for producing the bearing steel according to the embodiment, the order of adding deoxidizing agents is important when the molten steel is refined.

In an Al-deoxidizing process, the molten steel after adjusting the composition is Al-deoxidized by adding Al. In a REM-deoxidizing process, the molten steel after the Al-deoxidizing is REM-deoxidized by adding REM for 5 minutes to 10 minutes. In a vacuum-degassing process, the molten steel after the REM-deoxidizing may be vacuum-degassed as necessary by adding Ca. By conducting the ladle refining of the molten steel in which the deoxidizing agents are added in this order, the REM-Ca—Al—O—S complex oxysulfides are formed, and therefore, it is possible to suppress the formation of harmful $Al_2O_3$, the Al—Ca—O complex oxides, MnS, and TiN.

In order to add REM, misch metal or the like may be used, specifically, massive misch metal may be added to the molten steel at the end of the refining. In addition, in a fluxing process, the molten steel after the REM-deoxidizing and before the vacuum-degassing may be fluxed as necessary by adding a flux such as $CaO-CaF_2$ in order to appropriately desulfurize the molten steel and to change the properties of the inclusions.

The reason why the Al-deoxidizing process is conducted first is that the production cost increases when the deoxidization is conducted using elements other than Al. The reason why the REM-deoxidizing process is conducted after the Al-deoxidizing process is that REM is reacted with the Al—Ca—O complex oxides which are formed by reacting $Al_2O_3$ which is formed in the Al-deoxidizing process with Ca which is unavoidably contained in the molten steel, and thereby, the amount of the Al—Ca—O complex oxides remaining in the metallographic structure is decreased.

In addition, the reason why the deoxidization is conducted for 5 minutes to 10 minutes in the REM-deoxidizing process is as follows. When the deoxidization is shorter than 5 minutes, it is difficult to prevent the Al—Ca—O complex oxides from remaining. On the other hand, the upper limit of the deoxidization time is not particularly limited in the REM-deoxidizing process. However, when the deoxidization is longer than 10 minutes, the effect thereof is saturated.

The reason why the vacuum-degassing process may be conducted as necessary by adding Ca after the REM-deoxidizing process is as follows. When Ca is added before adding REM, in other words, when the vacuum-degassing process is conducted before the REM-deoxidizing process, the Al—Ca—O complex oxides which have the low melting point and which tend to be elongated may be excessively formed. The Al—Ca—O complex oxides are hardly formed by the amount of Ca which is unavoidably contained. However, the Al—Ca—O complex oxides may be excessively formed by the amount of Ca which is purposely added (for example, 0.00050% or more). Once the Al—Ca—O complex oxides are formed, it is difficult to sufficiently transform the inclusions even when REM is added after adding Ca. In addition, another reason of this process order is to suppress the formation of Ca-containing sulfides such as CaS, Ca—Mn—S, or the like.

It is preferable to conduct the vacuum-degassing process in which Ca is added when the molten steel includes, as the chemical composition, by mass %, S: more than 0.01% to 0.05%. As described above, when the S content is more than 0.01% to 0.05%, it is preferable to add Ca so that the Ca content is 0.00050% to 0.0050%. As a result, it is possible to further increase the effect such that the REM-Ca—Al—O—S complex oxysulfides fix S. Moreover, the MnS precipitates are sufficiently suppressed.

In addition, the reason why the fluxing process may be conducted as necessary after the REM-deoxidizing and before the vacuum-degassing process is as follows. When the flux is added before adding REM, in other words, when the fluxing process is conducted before the REM-deoxidizing process, the Al content in the REM-Ca—Al—O—S complex oxysulfides becomes more than 20 mass % in $Al_2O_3$ equivalent, the melting point of the complex oxysulfides is shifted to lower, and as a result, the complex oxysulfides tend to be fractured. The fractured complex oxysulfides negatively influence the fatigue properties in common with the elongated inclusions, and therefore, the effect in changing the properties of the inclusions derived from the added REM is not sufficiently obtained.

Subsequently, in a casting process, the molten steel after the REM-deoxidizing or after the vacuum-degassing process is cast in order to obtain a cast piece. In the casting process, it is preferable that the molten steel is cast and solidified while being rotated horizontally in a mold under a condition of 0.1 m/minute to 0.5 m/minute.

The specific gravity of the REM-Ca—Al—O—S complex oxysulfides formed by the ladle refining such as the Al deoxidization or REM deoxidization as described above is approximately 6 and is close to 7 which is the specific gravity of the steel. Thus, it is difficult for the REM-Ca—Al—O—S complex oxysulfides to be separated by flotation in the molten steel. Moreover, since the REM-Ca—Al—

O—S complex oxysulfides tend to penetrate deeply into unsolidified layer of the cast piece due to a downward flow when the molten steel is poured into the mold, the REM-Ca—Al—O—S complex oxysulfides tend to segregate in a center of the cast piece. When the REM-Ca—Al—O—S complex oxysulfides segregate in the center of the cast piece, the amount of the complex oxysulfides near a surface of the cast piece comparatively decreases. Thereby, the TiN-detoxifying effect of the REM-Ca—Al—O—S complex oxysulfides, by acting as the preferential nucleation sites of TiN, decreases near the surface of the cast piece.

Accordingly, it is preferable that the molten steel is stirred and rotated horizontally in the mold as necessary and that the inclusions is uniformly dispersed in order to suppress the segregation of the REM-Ca—Al—O—S complex oxysulfides. It is possible to uniformly disperse the REM-Ca—Al—O—S complex oxysulfides by rotating the molten steel horizontally in the mold under the condition of 0.1 m/minute to 0.5 m/minute. When the rate of the rotation in the mold is slower than 0.1 m/minute, the effect in uniformly dispersing the REM-Ca—Al—O—S complex oxysulfides is small. In addition, it is assumed that the upper limit of the range of the rotation rate is 0.5 m/minutes under a typical condition. For a method of stirring the molten steel, electromagnetic force or the like may be applied.

Subsequently, in a heating and holding process, the cast piece after the casting process is heated in a temperature range of 1270° C. to 1300° C. and is held after the heating in a temperature range of 1200° C. to 1250° C. for 60 seconds or longer. In the heating and holding process after the casting process, the cast piece which is cooled to a room temperature may be reheated and held, or the cast piece which is not cooled to the room temperature may be reheated and held. From an industrial standpoint, although the cast piece may be heated for a long time, for example, approximately 72 hours in a furnace in the temperature range of 1200° C. to 1250° C. for homogenization of the material, the heating does not negatively influence the control of the complex oxysulfides. Accordingly, the upper limit of the holding time in the temperature range of 1200° C. to 1250° C. is not particularly limited. The upper limit thereof may be 100 hours in consideration of the typical operational condition.

The reason why the cast piece is heated in the temperature range of 1270° C. to 1300° C. is that the temperature which is lower than 1270° C. is insufficient as a temperature of solutionizing treatment, and therefore, it is difficult to dissolve and solid-solute TiN which precipitates independently from the REM-Ca—Al—O—S complex oxysulfides during cooling after the casting process. For the temperature which is higher than 1300° C., expensive equipment is required for the heating and the cost of the heating also increases.

The reason why the cast piece is held in the temperature range of 1200° C. to 1250° C. after the heating is for preferential and complex precipitation of TiN, which is dissolved in the heating, on the surface of the REM-Ca—Al—O—S complex oxysulfides. In order to precipitate and sufficiently grow TiN on the surface of the REM-Ca—Al—O—S complex oxysulfides which act as the preferential nucleation sites, the holding for 60 seconds or longer is necessary. In addition, from an industrial standpoint, although the cast piece may be heated for a long time, for example, approximately 72 hours for homogenization of the material, the holding does not negatively influence the control of the complex oxysulfides.

In general steel, for example, in low carbon steel, even when the cast piece is heated in the temperature range of 1270° C. to 1300° C., and thereafter, is held in the temperature range of 1200° C. to 1250° C., TiN is in a state of being solid-soluted and is not precipitated. However, in the steel according to the embodiment, since the steel is high carbon steel such that the C content is 0.9% to 1.5% and the solubility of N of the steel is low, it is considered that TiN preferentially precipitates and grows on the REM-Ca—Al—O—S complex oxysulfides when the cast piece is held in this temperature range.

Subsequently, in a hot-plastic-working process, the cast piece after the heating and holding process is subjected to the plastic deformation such as hot forging or hot rolling in order to obtain the hot-worked steel (bearing steel). It is preferable that the hot-working is conducted in a temperature range of $A_{rm}$ (temperature where cementite starts to form in austenite during cooling in hyper-eutectoid steel) to 1200° C. When the hot-working is conducted at a temperature of lower than $A_{rm}$, the amount of cementite increases, and thereby, the plastic deformability decreases. When the hot-working is conducted at a temperature of higher than 1200° C., the production cost increases because the energy is excessively used for the heating. In addition, it is preferable that the cast piece after the heating and holding process is not cooled and is subjected to the hot-plastic-working process in view of the production cost. In addition, the hot-worked steel may be given a shape in the hot-plastic-working process in order to make the product (bearing steel or bearings) having a final shape.

Since the bearing steel according to the embodiment is the super-eutectoid steel containing 0.9% to 1.5% of C in mass %, the hot-worked steel generally shows the metallographic structure which mainly includes pre-eutectoid cementite with plate shape and pearlite. Moreover, the hardness thereof is hard, for example, approximately 250 Hv to 400 Hv in Vickers hardness.

Since the hot-worked steel after the hot-plastic-working process is hard, it is preferable that the hot-worked steel is subjected to a soft-annealing process of conducting heat treatment such as spheroidizing. In the soft-annealing process, it is preferable that the hot-worked steel is held in a temperature range of 700° C. to 750° C. for 30 hours to 50 hours. When the holding time is shorter than 30 hours, the softening is insufficient. When the holding time is longer than 50 hours, and the effect thereof is saturated. By the soft-annealing process, it is possible to proceed the spheroidizing of the carbides and to make the softened steel from the hot-worked steel.

The softened steel may be subjected to at least one of a cold-working process and a cutting process as necessary and may be formed in a shape which is close to that of a final part. Subsequently, in a quenching process, the steel with the shape which is close to that of the final part after the cold-working process and the cutting process is subjected to the quenching from a temperature range of 830° C. to 900° C. in order to increase the hardness. By the quenching process, it is possible to control the hardness of the steel to be 800 Hv or more in Vickers hardness. In addition, as necessary, in a final-finishing process, the steel after the quenching process may be subjected to the final-finishing which use a method capable of performing the highly hard or highly precise machining such as grinding, in order to make a bearing having the shape of the final part by forming a bearing sliding part or the like which is required to have a precise dimension.

Example 1

Hereinafter, the effect of an aspect of the present invention will be described in detail with reference to the following example. However, the condition in the example is an example condition employed to confirm the operability and the effects of the present invention, so that the present invention is not limited to the example condition. The present invention can employ various types of conditions as long as the conditions do not depart from the scope of the present invention and can achieve the object of the present invention.

The molten steel after adjusting the composition was subjected to the ladle refining which included, as necessary, the Al-deoxidizing process, the REM-deoxidizing process, the fluxing process, or the vacuum-degassing process with adding Ca in the order as shown in Tables 1 to 3. In the tables, the underlined values indicate out of the range of the present invention. Metallic Al was used in the Al-deoxidizing process, misch metal was used in the REM-deoxidizing process, Ca—Si alloy was used in the vacuum-degassing process, and a flux of $CaO:CaF_2=50:50$ (mass ratio) was used in the fluxing process.

The molten steel after the ladle refining was cast into a cast piece having 300 mm square in the casting process using a continuous casting apparatus. In Tables 4 to 9, the chemical composition of the cast piece is shown. The balance of the chemical composition was Fe and unavoidable impurities. In the tables, the underlined values indicate out of the range of the present invention, and the blank column indicates that no alloying element was purposely added. In addition, in the casting process, the rotation in the mold was conducted by electromagnetic stirring under the conditions as shown in Tables 1 to 3. The cast piece after the casting process was subjected to the heat treatment under the heating and holding condition as shown in Tables 1 to 3 in the heating and holding process.

The cast piece after the heating and holding process was hot-forged at a temperature of 1190° C. in the hot-plastic-working process in order to obtain a hot-worked steel (bearing steel) having a shape of round bar with 20 mm in diameter. As necessary, the hot-worked steel was subjected to a heat treatment at a temperature of 720° C. for 40 hours in the soft-annealing process in order to obtain a softened steel (bearing steel). Thereafter, the machining was conducted so as to have a shape of round bar with 10 mm in diameter by the cutting process. The steel after the cutting process was subjected to the quenching from a temperature of 850° C. in the quenching process in order to obtain a bearing steel which was a product.

In the observation of the metallographic structure, the inclusions in the steel was observed by using a scanning electron microscope after conducting a selective potentiostatic etching by electrolytic dissolution method (SPEED method) for an observing section which was a cross-section which was orthogonal to an extending direction of the bearing steel. The type of inclusions was identified by conducting a composition analysis using EDX. In the observation, when the radius of the observing section (cross-section perpendicular to the longitudinal direction) was r in unit of mm, an observing area which was from the surface to the depth of ½r was averagely observed. The observation was conducted on plural visual fields so that the observed area in total was at least 1000 $mm^2$, and the number of each inclusion was measured. In Tables 10 to 12, the number fraction of the complex oxysulfides in the total number of the inclusions, the number of the complex oxysulfides having the major axis of 5 μm or more in the observed section of 1 $mm^2$, the number of TiN existing independently from the complex oxysulfides and having the major axis of 5 μm or more in the observed section of 1 $mm^2$, the total number of MnS having the major axis of 10 μm or more and TiN existing independently from the complex oxysulfides and having the major axis of 5 μm or more in the observed section of 1 $mm^2$, and the Al content in the complex oxysulfides in $Al_2O_3$ equivalent are shown.

In addition, the fatigue properties of the above bearing steel were measured by an ultrasonic fatigue test under a load condition of 1000 MPa, and the fatigue properties were evaluated as L10 fatigue properties using Weibull statistics. When the L10 fatigue properties were $10 \times 10^6$ cycles or more, the fatigue properties were judged to be acceptable. In addition, for an evaluation of mechanical properties, the bearing steel was tempered at a temperature of 180° C., and thereafter, a Vickers hardness Hv was measured. When the temper hardness at the temperature of 180° C. was 600 Hv or more, the mechanical properties were judged to be acceptable.

The measurement results and evaluation results are shown in Tables 10 to 12. In the tables, the underlined values indicate out of the range of the present invention. In the tables, No. 1 to No. 61 are invention examples and No. 62 to No. 98 are comparative examples. As shown in Tables 10 to 12, in the invention examples, generally, TiN complexly precipitated on the REM-Ca—Al—O—S complex oxysulfides (in the tables, represented as REM-Ca—Al—O—S—(TiN)) was mainly observed, and $Al_2O_3$ and the Al—Ca—O complex oxides were almost not observed.

In addition, in No. 1 to No. 61 of the invention examples, the number or the fraction of the REM-Ca—Al—O—S complex oxysulfides, TiN, MnS, or the like achieved the target. As a result, in the invention examples, the L10 fatigue properties were $10 \times 10^6$ cycles or more, and therefore, the fatigue properties were acceptable. In addition, in the invention examples, the Vickers hardness Hv after the tempering at the temperature of 180° C. was 600 Hv or more, and therefore, the mechanical properties were acceptable.

On the other hand, in No. 62 to No. 98 of the comparative examples, the chemical composition, the metallographic structure, or the production method did not achieve the target. As a result, the L10 fatigue properties and/or the Vickers hardness Hv after the tempering at the temperature of 180° C. was insufficient.

In Nos. 62 to 65 of the comparative Examples, the Ca content was less than the range of the present invention. As a result, the formation of the oxysulfides was insufficient, the number of the elongated sulfides was excessive, and the L10 fatigue properties were insufficient.

In No. 66 of the comparative example, the heating temperature and the holding time were less than the range of the present invention. As a result, the number of TiN existing independently from the REM-Ca—Al—O—S complex oxysulfides was excessive and the L10 fatigue properties were insufficient.

In Nos. 67, 68, 73 to 75, and 78 to 98 of the comparative examples, the alloying elements were out of the range of the present invention. As a result, the L10 fatigue properties were insufficient, the quenching cracks or the cracks during working occurred, or the performance as the bearings was not satisfied.

In No. 69 of the comparative example, the REM content was more than the range of the present invention. As a result, the adhesion to the refractory was excessive and the production was judged as difficult.

In Nos. 70 and 72 of the comparative example, the order of the processes during the ladle refining was different from that of the present invention. As a result, the morphology of the oxysulfides or the oxides changed, the inclusions coarsened, and the L10 fatigue properties were insufficient.

In No. 71 of the comparative example, the REM-deoxidizing time was shorter than the range of the invention. As a result, the formation of the oxysulfides was insufficient, the number of the elongated sulfides was excessive, and the L10 fatigue properties were insufficient.

In No. 76 of the comparative example, the holding temperature was lower than the range of the invention. As a result, the number of TiN existing independently from the REM-Ca—Al—O—S complex oxysulfides was excessive and the L10 fatigue properties were insufficient.

In No. 77 of the comparative example, the holding temperature was higher than the range of the present invention (thus, the holding time in the temperature range of 1200° C. to 1250° C. during cooling thereafter was 60 seconds or shorter). As a result, the number of TiN existing independently from the REM-Ca—Al—O—S complex oxysulfides was excessive and the L10 fatigue properties were insufficient.

[Table 1]

TABLE 1

| | | PRODUCTION CONDITION | | | | | |
|---|---|---|---|---|---|---|---|
| | | LADLE REFINING CONDITION | | CASTING CONDITION | HEATING AND HOLDING CONDITION | | |
| No. | | IN ORDER OF AL-DEOXIDIZING PROCESS, REM-DEOXIDIZING PROCESS, FLUXING PROCESS, OR VACUUM-DEGASSING PROCESS | REM-DEOXIDIZING TIME (minute) | ROTATION FLOW RATE IN MOLD (mpm) | HEATING TEMPERATURE (° C.) | HOLDING TEMPERATURE (° C.) | HOLDING TIME (second) |
| INVENTIVE EXAMPLE | 1 | Al→REM | 8 | — | 1280 | 1220 | 120 |
| | 2 | Al→REM | 8 | — | 1280 | 1220 | 120 |
| | 3 | Al→REM | 8 | — | 1280 | 1220 | 120 |
| | 4 | Al→REM→DEGASSING | 8 | 0.05 | 1280 | 1220 | 120 |
| | 5 | Al→REM→DEGASSING | 8 | 0.2 | 1280 | 1220 | 120 |
| | 6 | Al→REM→DEGASSING | 8 | 0.2 | 1280 | 1220 | 120 |
| | 7 | Al→REM→DEGASSING | 8 | 0.2 | 1280 | 1220 | 120 |
| | 8 | Al→REM→DEGASSING | 8 | 0.2 | 1280 | 1220 | 120 |
| | 9 | Al→REM→DEGASSING | 8 | 0.2 | 1280 | 1220 | 120 |
| | 10 | Al→REM→DEGASSING | 8 | 0.2 | 1280 | 1220 | 120 |
| | 11 | Al→REM→DEGASSING | 8 | 0.2 | 1280 | 1220 | 120 |
| | 12 | Al→REM→DEGASSING | 8 | 0.2 | 1280 | 1220 | 120 |
| | 13 | Al→REM→DEGASSING | 8 | 0.2 | 1280 | 1220 | 120 |
| | 14 | Al→REM→DEGASSING | 8 | 0.2 | 1280 | 1220 | 120 |
| | 15 | Al→REM→DEGASSING | 10 | 0.25 | 1280 | 1220 | 120 |
| | 16 | Al→REM→DEGASSING | 6 | 0.15 | 1280 | 1220 | 120 |
| | 17 | Al→REM→DEGASSING | 8 | 0.2 | 1280 | 1220 | 120 |
| | 18 | Al→REM→DEGASSING | 8 | 0.2 | 1280 | 1220 | 120 |
| | 19 | Al→REM→DEGASSING | 8 | 0.2 | 1280 | 1220 | 120 |
| | 20 | Al→REM→DEGASSING | 10 | 0.2 | 1280 | 1220 | 200 |
| | 21 | Al→REM→DEGASSING | 8 | 0.2 | 1280 | 1220 | 120 |
| | 22 | Al→REM→DEGASSING | 6 | 0.2 | 1280 | 1220 | 70 |
| | 23 | Al→REM→DEGASSING | 6 | 0.25 | 1280 | 1220 | 120 |
| | 24 | Al→REM→DEGASSING | 8 | 0.2 | 1280 | 1220 | 120 |
| | 25 | Al→REM→DEGASSING | 8 | 0.2 | 1280 | 1220 | 120 |
| | 26 | Al→REM→DEGASSING | 8 | 0.2 | 1280 | 1220 | 120 |
| | 27 | Al→REM→DEGASSING | 8 | 0.2 | 1280 | 1220 | 120 |
| | 28 | Al→REM→DEGASSING | 6 | 0.2 | 1280 | 1220 | 120 |
| | 29 | Al→REM→DEGASSING | 6 | 0.25 | 1280 | 1220 | 150 |
| | 30 | Al→REM→DEGASSING | 8 | 0.15 | 1280 | 1220 | 120 |

[Table 2]

TABLE 2

| | | PRODUCTION CONDITION | | | | | |
|---|---|---|---|---|---|---|---|
| | | LADLE REFINING CONDITION | | CASTING CONDITION | HEATING AND HOLDING CONDITION | | |
| No. | | IN ORDER OF AL-DEOXIDIZING PROCESS, REM-DEOXIDIZING PROCESS, FLUXING PROCESS, OR VACUUM-DEGASSING PROCESS | REM-DEOXIDIZING TIME (minute) | ROTATION FLOW RATE IN MOLD (mpm) | HEATING TEMPERATURE (° C.) | HOLDING TEMPERATURE (° C.) | HOLDING TIME (second) |
| INVENTIVE EXAMPLE | 31 | Al→REM→DEGASSING | 8 | 0.2 | 1280 | 1220 | 120 |
| | 32 | Al→REM→DEGASSING | 8 | 0.2 | 1280 | 1220 | 120 |
| | 33 | Al→REM→DEGASSING | 8 | 0.2 | 1280 | 1220 | 120 |
| | 34 | Al→REM→DEGASSING | 8 | 0.2 | 1280 | 1220 | 120 |
| | 35 | Al→REM→DEGASSING | 6 | 0.2 | 1280 | 1220 | 120 |

TABLE 2-continued

| | | PRODUCTION CONDITION | | | | | |
|---|---|---|---|---|---|---|---|
| | | LADLE REFINING CONDITION | | CASTING CONDITION | | | |
| | | IN ORDER OF AL-DEOXIDIZING PROCESS, REM-DEOXIDIZING PROCESS, FLUXING PROCESS, OR VACUUM-DEGASSING PROCESS | REM-DEOXIDIZING TIME (minute) | ROTATION FLOW RATE IN MOLD (mpm) | HEATING AND HOLDING CONDITION | | |
| No. | | | | | HEATING TEMPERATURE (° C.) | HOLDING TEMPERATURE (° C.) | HOLDING TIME (second) |
| | 36 | Al→REM→DEGASSING | 8 | 0.2 | 1280 | 1220 | 120 |
| | 37 | Al→REM→DEGASSING | 10 | 0.2 | 1280 | 1220 | 300 |
| | 38 | Al→REM→DEGASSING | 8 | 0.2 | 1280 | 1220 | 120 |
| | 39 | Al→REM→DEGASSING | 8 | 0.2 | 1280 | 1220 | 120 |
| | 40 | Al→REM→DEGASSING | 8 | 0.2 | 1280 | 1220 | 120 |
| | 41 | Al→REM→DEGASSING | 8 | 0.2 | 1280 | 1220 | 120 |
| | 42 | Al→REM→DEGASSING | 8 | 0.2 | 1280 | 1220 | 120 |
| | 43 | Al→REM→DEGASSING | 8 | 0.2 | 1280 | 1220 | 120 |
| | 44 | Al→REM→DEGASSING | 8 | 0.2 | 1280 | 1220 | 120 |
| | 45 | Al→REM→DEGASSING | 8 | 0.2 | 1280 | 1220 | 120 |
| | 46 | Al→REM→DEGASSING | 8 | 0.2 | 1280 | 1220 | 120 |
| | 47 | Al→REM→DEGASSING | 8 | 0.2 | 1280 | 1220 | 120 |
| | 48 | Al→REM→DEGASSING | 8 | 0.2 | 1280 | 1220 | 120 |
| | 49 | Al→REM→DEGASSING | 8 | 0.2 | 1280 | 1220 | 120 |
| | 50 | Al→REM→DEGASSING | 8 | 0.2 | 1280 | 1220 | 120 |
| | 51 | Al→REM→DEGASSING | 8 | 0.2 | 1280 | 1220 | 72 HOURS |
| | 52 | Al→REM→DEGASSING | 8 | 0.2 | 1280 | 1220 | 120 |
| | 53 | Al→REM→DEGASSING | 12 | 0.2 | 1280 | 1220 | 120 |
| | 54 | Al→REM→DEGASSING | 6 | 0.2 | 1280 | 1220 | 150 |
| | 55 | Al→REM→DEGASSING | 8 | 0.35 | 1280 | 1220 | 120 |
| | 56 | Al→REM→DEGASSING | 8 | 0.3 | 1280 | 1220 | 80 |
| | 57 | Al→REM→Flux→DEGASSING | 6 | 0.2 | 1280 | 1220 | 120 |
| | 58 | Al→REM→DEGASSING | 8 | 0.2 | 1280 | 1220 | 120 |
| | 59 | Al→REM→DEGASSING | 8 | 0.2 | 1280 | 1220 | 120 |
| | 60 | Al→REM→DEGASSING | 8 | 0.2 | 1280 | 1220 | 120 |
| | 61 | Al→REM→DEGASSING | 8 | 0.2 | 1280 | 1220 | 120 |

[Table 3]

TABLE 3

| | | PRODUCTION CONDITION | | | | | |
|---|---|---|---|---|---|---|---|
| | | LADLE REFINING CONDITION | | CASTING CONDITION | | | |
| | | IN ORDER OF AL-DEOXIDIZING PROCESS, REM-DEOXIDIZING PROCESS, FLUXING PROCESS, OR VACUUM-DEGASSING PROCESS | REM-DEOXIDIZING TIME (minute) | ROTATION FLOW RATE IN MOLD (mpm) | HEATING AND HOLDING CONDITION | | |
| No. | | | | | HEATING TEMPERATURE (° C.) | HOLDING TEMPERATURE (° C.) | HOLDING TIME (second) |
| COMPARATIVE EXAMPLE | 62 | Al→REM | 6 | 0.2 | 1280 | 1220 | 150 |
| | 63 | Al→REM | 6 | 0.2 | 1280 | 1220 | 150 |
| | 64 | Al→REM | 8 | — | 1280 | 1220 | 120 |
| | 65 | Al→REM | 8 | — | 1280 | 1220 | 120 |
| | 66 | Al→REM→DEGASSING | 6 | 0.2 | 1250 | 1200 | 45 |
| | 67 | Al→REM→DEGASSING | 6 | 0.3 | 1280 | 1220 | 150 |
| | 68 | Al→REM→DEGASSING | 6 | 0.2 | 1280 | 1220 | 120 |
| | 69 | Al→REM→DEGASSING | 6 | 0.2 | — | — | — |
| | 70 | Al→DEGASSING→REM | 6 | 0.2 | 1280 | 1220 | 120 |
| | 71 | Al→REM→DEGASSING | 3 | 0.2 | 1280 | 1220 | 80 |
| | 72 | Al→Flux→DEGASSING→REM | 6 | 0.2 | 1280 | 1220 | 120 |
| | 73 | Al→REM→DEGASSING | 8 | 0.2 | 1280 | 1220 | 120 |
| | 74 | Al→REM→DEGASSING | 8 | 0.2 | 1280 | 1220 | 120 |
| | 75 | Al→REM→DEGASSING | 6 | 0.2 | 1280 | 1220 | 120 |
| | 76 | Al→REM→DEGASSING | 6 | 0.2 | 1280 | 1190 | 120 |
| | 77 | Al→REM→DEGASSING | 6 | 0.2 | 1280 | 1260 | 120 |
| | 78 | Al→REM→DEGASSING | 8 | 0.2 | 1280 | 1220 | 120 |
| | 79 | Al→REM→DEGASSING | 8 | 0.2 | 1280 | 1220 | 120 |
| | 80 | Al→REM→DEGASSING | 8 | 0.2 | 1280 | 1220 | 120 |
| | 81 | Al→REM→DEGASSING | 8 | 0.2 | 1280 | 1220 | 120 |
| | 82 | Al→REM→DEGASSING | 8 | 0.2 | 1280 | 1220 | 120 |
| | 83 | Al→REM→DEGASSING | 8 | 0.2 | 1280 | 1220 | 120 |
| | 84 | Al→REM→DEGASSING | 8 | 0.2 | 1280 | 1220 | 120 |

TABLE 3-continued

| | | PRODUCTION CONDITION | | | | |
|---|---|---|---|---|---|---|
| | | LADLE REFINING CONDITION | | CASTING CONDITION | HEATING AND HOLDING CONDITION | |
| No. | | IN ORDER OF AL-DEOXIDIZING PROCESS, REM-DEOXIDIZING PROCESS, FLUXING PROCESS, OR VACUUM-DEGASSING PROCESS | REM-DEOXIDIZING TIME (minute) | ROTATION FLOW RATE IN MOLD (mpm) | HEATING TEMPERATURE (° C.) | HOLDING TEMPERATURE (° C.) | HOLDING TIME (second) |
| | 85 | Al→REM→DEGASSING | 8 | 0.2 | 1280 | 1220 | 120 |
| | 86 | Al→REM→DEGASSING | 8 | 0.2 | 1280 | 1220 | 120 |
| | 87 | Al→REM→DEGASSING | 8 | 0.2 | 1280 | 1220 | 120 |
| | 88 | Al→REM→DEGASSING | 8 | 0.2 | 1280 | 1220 | 120 |
| | 89 | Al→REM→DEGASSING | 8 | 0.2 | 1280 | 1220 | 120 |
| | 90 | Al→REM→DEGASSING | 8 | 0.2 | 1280 | 1220 | 120 |
| | 91 | Al→REM→DEGASSING | 8 | 0.2 | 1280 | 1220 | 120 |
| | 92 | Al→REM→DEGASSING | 8 | 0.2 | 1280 | 1220 | 120 |
| | 93 | Al→REM→DEGASSING | 8 | 0.2 | 1280 | 1220 | 120 |
| | 94 | Al→REM→DEGASSING | 8 | 0.2 | 1280 | 1220 | 120 |
| | 95 | Al→REM→DEGASSING | 8 | 0.2 | 1280 | 1220 | 120 |
| | 96 | Al→REM→DEGASSING | 8 | 0.2 | 1280 | 1220 | 120 |
| | 97 | Al→REM→DEGASSING | 8 | 0.2 | 1280 | 1220 | 120 |
| | 98 | Al→REM→DEGASSING | 8 | 0.2 | 1280 | 1220 | 120 |

[Table 4]

TABLE 4

PRODUCTION RESULT
CHEMICAL COMPOSITION OF CAST PIECE (MASS %)

| | No. | C | Si | Mn | P | S | Cr | Al | Ca | REM | Ti | N | O |
|---|---|---|---|---|---|---|---|---|---|---|---|---|---|
| INVENTIVE EXAMPLE | 1 | 0.99 | 0.26 | 0.71 | 0.010 | 0.009 | 1.17 | 0.033 | 0.00004 | 0.0003 | 0.002 | 0.0062 | 0.0013 |
| | 2 | 0.97 | 0.22 | 0.75 | 0.011 | 0.011 | 1.20 | 0.033 | 0.00002 | 0.0064 | 0.003 | 0.0057 | 0.0013 |
| | 3 | 1.10 | 0.24 | 0.90 | 0.011 | 0.049 | 1.09 | 0.034 | 0.00003 | 0.0052 | 0.002 | 0.0064 | 0.0011 |
| | 4 | 1.06 | 0.22 | 0.82 | 0.010 | 0.007 | 0.60 | 0.028 | 0.00030 | 0.0009 | 0.002 | 0.0074 | 0.0012 |
| | 5 | 1.08 | 0.23 | 0.76 | 0.011 | 0.007 | 1.14 | 0.035 | 0.00030 | 0.0012 | 0.002 | 0.0056 | 0.0006 |
| | 6 | 0.98 | 0.30 | 0.74 | 0.011 | 0.007 | 1.19 | 0.037 | 0.00031 | 0.0031 | 0.003 | 0.0057 | 0.0011 |
| | 7 | 1.03 | 0.22 | 0.83 | 0.012 | 0.0066 | 1.04 | 0.030 | 0.00034 | 0.0029 | 0.0019 | 0.0054 | 0.0007 |
| | 8 | 1.00 | 0.23 | 0.72 | 0.014 | 0.008 | 1.05 | 0.029 | 0.00041 | 0.0003 | 0.0045 | 0.0075 | 0.0010 |
| | 9 | 0.98 | 0.28 | 0.79 | 0.011 | 0.007 | 1.19 | 0.031 | 0.00044 | 0.0019 | 0.001 | 0.0057 | 0.0007 |
| | 10 | 1.04 | 0.21 | 0.87 | 0.010 | 0.009 | 1.16 | 0.034 | 0.00045 | 0.0017 | 0.002 | 0.0074 | 0.0010 |
| | 11 | 1.05 | 0.23 | 0.79 | 0.012 | 0.009 | 1.01 | 0.028 | 0.00029 | 0.0005 | 0.001 | 0.0070 | 0.0013 |
| | 12 | 1.05 | 0.22 | 0.75 | 0.015 | 0.011 | 1.09 | 0.037 | 0.00039 | 0.0068 | 0.003 | 0.0067 | 0.0012 |
| | 13 | 1.01 | 0.23 | 0.76 | 0.010 | 0.009 | 1.16 | 0.038 | 0.00121 | 0.0067 | 0.002 | 0.0069 | 0.0009 |
| | 14 | 1.10 | 0.22 | 0.86 | 0.014 | 0.011 | 1.02 | 0.032 | 0.00071 | 0.0052 | 0.002 | 0.0064 | 0.0009 |
| | 15 | 0.98 | 0.24 | 0.74 | 0.007 | 0.007 | 1.04 | 0.026 | 0.00060 | 0.0050 | 0.0006 | 0.005 | 0.0006 |
| | 16 | 1.00 | 0.25 | 0.75 | 0.007 | 0.003 | 1.05 | 0.025 | 0.00080 | 0.0007 | 0.0006 | 0.004 | 0.0006 |
| | 17 | 1.00 | 0.28 | 0.73 | 0.014 | 0.006 | 1.17 | 0.032 | 0.00083 | 0.0051 | 0.003 | 0.0045 | 0.0010 |
| | 18 | 0.96 | 0.30 | 0.74 | 0.012 | 0.006 | 1.14 | 0.028 | 0.00087 | 0.0013 | 0.002 | 0.0045 | 0.0011 |
| | 19 | 1.04 | 0.29 | 0.84 | 0.013 | 0.007 | 1.12 | 0.035 | 0.00088 | 0.0025 | 0.002 | 0.0059 | 0.0009 |
| | 20 | 1.00 | 0.24 | 0.75 | 0.007 | 0.008 | 1.05 | 0.027 | 0.00090 | 0.0060 | 0.0004 | 0.006 | 0.0005 |
| | 21 | 1.09 | 0.28 | 0.81 | 0.010 | 0.009 | 1.20 | 0.039 | 0.00097 | 0.00167 | 0.0014 | 0.0057 | 0.0009 |
| | 22 | 1.01 | 0.65 | 0.74 | 0.007 | 0.005 | 1.04 | 0.026 | 0.00100 | 0.0018 | 0.0004 | 0.005 | 0.0005 |
| | 23 | 0.98 | 0.26 | 0.76 | 0.006 | 0.006 | 1.05 | 0.027 | 0.00100 | 0.0022 | 0.0009 | 0.004 | 0.0004 |
| | 24 | 0.92 | 0.25 | 0.75 | 0.007 | 0.016 | 0.99 | 0.015 | 0.00100 | 0.0090 | 0.0040 | 0.012 | 0.0015 |
| | 25 | 1.08 | 0.24 | 0.76 | 0.015 | 0.006 | 1.15 | 0.036 | 0.00103 | 0.0059 | 0.003 | 0.0072 | 0.0009 |
| | 26 | 1.01 | 0.24 | 0.83 | 0.012 | 0.008 | 1.04 | 0.038 | 0.00104 | 0.0060 | 0.002 | 0.0071 | 0.0014 |
| | 27 | 1.01 | 0.25 | 0.75 | 0.008 | 0.007 | 1.04 | 0.025 | 0.00110 | 0.0020 | 0.0006 | 0.005 | 0.0005 |
| | 28 | 1.01 | 0.25 | 0.75 | 0.007 | 0.005 | 1.03 | 0.024 | 0.00110 | 0.0013 | 0.0015 | 0.005 | 0.0005 |
| | 29 | 1.00 | 0.25 | 0.74 | 0.010 | 0.006 | 1.05 | 0.026 | 0.00110 | 0.0043 | 0.0010 | 0.005 | 0.0005 |
| | 30 | 0.99 | 0.25 | 0.74 | 0.007 | 0.007 | 1.04 | 0.025 | 0.00110 | 0.0046 | 0.0009 | 0.005 | 0.0005 |

TABLE 5

PRODUCTION RESULT
CHEMICAL COMPOSITION OF CAST PIECE (MASS %)

| | No. | C | Si | Mn | P | S | Cr | Al | Ca | REM | Ti | N | O |
|---|---|---|---|---|---|---|---|---|---|---|---|---|---|
| INVENTIVE EXAMPLE | 31 | 0.96 | 0.30 | 0.86 | 0.010 | 0.007 | 1.11 | 0.033 | 0.00114 | 0.0067 | 0.001 | 0.0080 | 0.0010 |
| | 32 | 1.07 | 0.23 | 0.89 | 0.014 | 0.008 | 1.01 | 0.031 | 0.00121 | 0.0054 | 0.002 | 0.0064 | 0.0010 |
| | 33 | 1.04 | 0.22 | 0.72 | 0.013 | 0.009 | 1.04 | 0.040 | 0.00121 | 0.0041 | 0.002 | 0.0061 | 0.0010 |
| | 34 | 1.10 | 0.21 | 0.71 | 0.014 | 0.009 | 1.09 | 0.035 | 0.00131 | 0.0069 | 0.001 | 0.0075 | 0.0006 |
| | 35 | 0.98 | 0.24 | 0.75 | 0.007 | 0.007 | 1.05 | 0.022 | 0.00150 | 0.0023 | 0.0008 | 0.005 | 0.0006 |
| | 36 | 1.02 | 0.27 | 0.77 | 0.013 | 0.0094 | 1.07 | 0.040 | 0.00169 | 0.00592 | 0.0015 | 0.0080 | 0.0009 |
| | 37 | 1.45 | 0.25 | 0.75 | 0.007 | 0.009 | 1.04 | 0.025 | 0.00170 | 0.0160 | 0.0020 | 0.008 | 0.0004 |
| | 38 | 1.03 | 0.27 | 0.83 | 0.013 | 0.009 | 1.13 | 0.031 | 0.00177 | 0.0034 | 0.002 | 0.0079 | 0.0005 |
| | 39 | 0.98 | 0.27 | 0.79 | 0.011 | 0.007 | 0.97 | 0.029 | 0.00040 | 0.0016 | 0.002 | 0.0054 | 0.0013 |
| | 40 | 1.04 | 0.23 | 0.77 | 0.015 | 0.008 | 1.13 | 0.027 | 0.00130 | 0.0007 | 0.002 | 0.0064 | 0.0009 |
| | 41 | 1.07 | 0.28 | 0.88 | 0.011 | 0.006 | 1.05 | 0.032 | 0.00182 | 0.0015 | 0.003 | 0.0060 | 0.0012 |
| | 42 | 0.97 | 0.26 | 0.90 | 0.012 | 0.009 | 1.03 | 0.039 | 0.00131 | 0.0017 | 0.003 | 0.0068 | 0.0011 |
| | 43 | 1.06 | 0.21 | 0.85 | 0.015 | 0.006 | 1.08 | 0.027 | 0.00121 | 0.0031 | 0.003 | 0.0079 | 0.0010 |
| | 44 | 0.98 | 0.22 | 0.76 | 0.015 | 0.006 | 1.72 | 0.033 | 0.00115 | 0.0008 | 0.003 | 0.0046 | 0.0009 |
| | 45 | 1.08 | 0.23 | 0.80 | 0.013 | 0.008 | 1.55 | 0.026 | 0.00129 | 0.0010 | 0.002 | 0.0074 | 0.0010 |
| | 46 | 0.99 | 0.20 | 0.74 | 0.014 | 0.007 | 1.01 | 0.031 | 0.00061 | 0.0007 | 0.002 | 0.0047 | 0.0009 |
| | 47 | 0.95 | 0.23 | 0.85 | 0.010 | 0.010 | 1.02 | 0.033 | 0.00189 | 0.0064 | 0.002 | 0.0057 | 0.0013 |
| | 48 | 1.02 | 0.22 | 0.89 | 0.011 | 0.007 | 1.14 | 0.033 | 0.00073 | 0.0020 | 0.002 | 0.0055 | 0.0009 |
| | 49 | 1.01 | 0.29 | 0.89 | 0.012 | 0.007 | 1.11 | 0.031 | 0.00033 | 0.0070 | 0.002 | 0.0060 | 0.0006 |
| | 50 | 1.10 | 0.22 | 0.71 | 0.011 | 0.009 | 1.03 | 0.033 | 0.00164 | 0.0062 | 0.001 | 0.0078 | 0.0007 |
| | 51 | 0.98 | 0.29 | 0.82 | 0.013 | 0.006 | 1.03 | 0.031 | 0.00044 | 0.0038 | 0.003 | 0.0073 | 0.0007 |
| | 52 | 1.00 | 0.26 | 0.77 | 0.011 | 0.006 | 1.17 | 0.039 | 0.00068 | 0.0005 | 0.002 | 0.0055 | 0.0010 |
| | 53 | 1.01 | 0.25 | 0.75 | 0.007 | 0.009 | 1.05 | 0.025 | 0.00200 | 0.0390 | 0.0010 | 0.005 | 0.0005 |
| | 54 | 0.99 | 0.24 | 0.73 | 0.007 | 0.003 | 1.05 | 0.023 | 0.00200 | 0.0011 | 0.0011 | 0.004 | 0.0005 |
| | 55 | 1.01 | 0.24 | 0.76 | 0.008 | 0.008 | 1.04 | 0.038 | 0.00200 | 0.0055 | 0.0012 | 0.006 | 0.0003 |
| | 56 | 1.00 | 0.26 | 0.75 | 0.008 | 0.008 | 1.05 | 0.024 | 0.00200 | 0.0110 | 0.0010 | 0.005 | 0.0004 |
| | 57 | 1.01 | 0.25 | 0.75 | 0.007 | 0.001 | 1.05 | 0.025 | 0.00250 | 0.0020 | 0.0025 | 0.005 | 0.0005 |
| | 58 | 1.02 | 0.24 | 1.10 | 0.007 | 0.009 | 1.05 | 0.025 | 0.00440 | 0.0150 | 0.0009 | 0.005 | 0.0003 |
| | 59 | 0.97 | 0.26 | 0.84 | 0.011 | 0.009 | 1.13 | 0.025 | 0.00241 | 0.0032 | 0.002 | 0.0069 | 0.0011 |
| | 60 | 0.98 | 0.27 | 0.79 | 0.015 | 0.011 | 1.14 | 0.038 | 0.00250 | 0.0062 | 0.002 | 0.0047 | 0.0007 |
| | 61 | 1.07 | 0.24 | 0.72 | 0.015 | 0.049 | 1.09 | 0.028 | 0.00149 | 0.0064 | 0.001 | 0.0049 | 0.0007 |

TABLE 6

PRODUCTION RESULT
CHEMICAL COMPOSITION OF CAST PIECE (MASS %)

| | No. | C | Si | Mn | P | S | Cr | Al | Ca | REM | Ti | N | O |
|---|---|---|---|---|---|---|---|---|---|---|---|---|---|
| COMPARATIVE EXAMPLE | 62 | 1.00 | 0.25 | 0.75 | 0.007 | 0.005 | 1.04 | 0.025 | 0.000004 | 0.0025 | 0.0007 | 0.005 | 0.0005 |
| | 63 | 0.99 | 0.24 | 0.76 | 0.007 | 0.006 | 1.04 | 0.021 | 0.000005 | 0.0033 | 0.0008 | 0.004 | 0.0005 |
| | 64 | 1.01 | 0.25 | 0.73 | 0.011 | 0.007 | 1.06 | 0.026 | 0.000008 | 0.0029 | 0.002 | 0.0048 | 0.0010 |
| | 65 | 0.96 | 0.27 | 0.81 | 0.014 | 0.020 | 1.03 | 0.032 | 0.000008 | 0.0016 | 0.002 | 0.0046 | 0.0011 |
| | 66 | 0.99 | 0.25 | 0.75 | 0.006 | 0.008 | 1.05 | 0.025 | 0.00080 | 0.0020 | 0.0005 | 0.005 | 0.0005 |
| | 67 | 0.99 | 0.25 | 0.74 | 0.006 | 0.014 | 1.03 | 0.026 | 0.00100 | 0.0030 | 0.0080 | 0.007 | 0.0004 |
| | 68 | 1.02 | 0.25 | 0.75 | 0.008 | 0.005 | 1.04 | 0.025 | 0.00110 | 0.00007 | 0.0008 | 0.005 | 0.0005 |
| | 69 | 1.01 | 0.25 | 0.74 | 0.007 | 0.009 | 1.02 | 0.024 | 0.00110 | 0.0630 | 0.0017 | 0.005 | 0.0005 |
| | 70 | 1.00 | 0.25 | 0.75 | 0.007 | 0.006 | 1.04 | 0.025 | 0.00150 | 0.0030 | 0.0010 | 0.005 | 0.0006 |
| | 71 | 1.00 | 0.24 | 0.76 | 0.007 | 0.007 | 1.05 | 0.025 | 0.00170 | 0.0035 | 0.0003 | 0.005 | 0.0009 |
| | 72 | 1.00 | 0.26 | 0.75 | 0.007 | 0.001 | 1.07 | 0.024 | 0.00240 | 0.0015 | 0.0025 | 0.005 | 0.0005 |
| | 73 | 1.03 | 0.22 | 0.87 | 0.011 | 0.061 | 1.11 | 0.030 | 0.00490 | 0.0010 | 0.001 | 0.0070 | 0.0013 |
| | 74 | 0.97 | 0.28 | 0.71 | 0.015 | 0.049 | 1.06 | 0.034 | 0.00510 | 0.0055 | 0.002 | 0.0051 | 0.0013 |
| | 75 | 1.01 | 0.26 | 0.75 | 0.007 | 0.006 | 1.05 | 0.023 | 0.00590 | 0.0017 | 0.0008 | 0.005 | 0.0005 |
| | 76 | 1.05 | 0.21 | 0.73 | 0.014 | 0.007 | 1.05 | 0.038 | 0.00146 | 0.0066 | 0.002 | 0.0070 | 0.0006 |
| | 77 | 1.10 | 0.23 | 0.90 | 0.013 | 0.008 | 1.16 | 0.036 | 0.00083 | 0.0064 | 0.002 | 0.0059 | 0.0006 |
| | 78 | 0.88 | 0.28 | 0.71 | 0.013 | 0.007 | 1.13 | 0.025 | 0.00144 | 0.0016 | 0.002 | 0.0074 | 0.0014 |
| | 79 | 1.52 | 0.22 | 0.83 | 0.013 | 0.007 | 1.14 | 0.039 | 0.00171 | 0.0057 | 0.003 | 0.0058 | 0.0008 |
| | 80 | 1.03 | 0.08 | 0.77 | 0.013 | 0.007 | 1.16 | 0.029 | 0.00064 | 0.0032 | 0.003 | 0.0072 | 0.0010 |
| | 81 | 1.02 | 0.82 | 0.78 | 0.010 | 0.007 | 1.14 | 0.030 | 0.00047 | 0.0010 | 0.003 | 0.0063 | 0.0007 |
| | 82 | 1.03 | 0.26 | 0.08 | 0.012 | 0.006 | 1.06 | 0.035 | 0.00174 | 0.0059 | 0.001 | 0.0043 | 0.0006 |
| | 83 | 0.98 | 0.26 | 1.52 | 0.014 | 0.005 | 1.14 | 0.035 | 0.00167 | 0.0059 | 0.001 | 0.0069 | 0.0006 |
| | 84 | 1.07 | 0.28 | 0.78 | 0.032 | 0.008 | 1.12 | 0.036 | 0.00128 | 0.0041 | 0.003 | 0.0072 | 0.0015 |
| | 85 | 0.99 | 0.21 | 0.76 | 0.011 | 0.009 | 0.48 | 0.036 | 0.00149 | 0.0018 | 0.003 | 0.0064 | 0.0014 |
| | 86 | 1.09 | 0.25 | 0.73 | 0.011 | 0.005 | 2.22 | 0.031 | 0.00040 | 0.0041 | 0.002 | 0.0071 | 0.0013 |
| | 87 | 1.09 | 0.23 | 0.73 | 0.013 | 0.008 | 1.03 | 0.008 | 0.00156 | 0.0019 | 0.003 | 0.0045 | 0.0015 |
| | 88 | 1.01 | 0.29 | 0.80 | 0.013 | 0.005 | 1.11 | 0.052 | 0.00095 | 0.0036 | 0.002 | 0.0051 | 0.0009 |
| | 89 | 0.99 | 0.25 | 0.81 | 0.012 | 0.008 | 1.06 | 0.030 | 0.00086 | 0.0043 | 0.003 | 0.0160 | 0.0008 |
| | 90 | 1.01 | 0.23 | 0.72 | 0.014 | 0.006 | 1.08 | 0.031 | 0.00190 | 0.0011 | 0.001 | 0.0073 | 0.00008 |
| | 91 | 1.02 | 0.25 | 0.82 | 0.010 | 0.010 | 1.16 | 0.037 | 0.00192 | 0.0011 | 0.001 | 0.0069 | 0.0032 |

TABLE 6-continued

| | | | | | PRODUCTION RESULT | | | | | | | |
|---|---|---|---|---|---|---|---|---|---|---|---|---|
| | | | | CHEMICAL COMPOSITION OF CAST PIECE (MASS %) | | | | | | | | |
| No. | C | Si | Mn | P | S | Cr | Al | Ca | REM | Ti | N | O |
| 92 | 0.97 | 0.21 | 0.89 | 0.013 | 0.009 | 1.18 | 0.028 | 0.00077 | 0.0050 | 0.002 | 0.0059 | 0.0013 |
| 93 | 1.06 | 0.25 | 0.83 | 0.014 | 0.008 | 1.01 | 0.040 | 0.00110 | 0.0037 | 0.002 | 0.0054 | 0.0007 |
| 94 | 1.02 | 0.27 | 0.79 | 0.014 | 0.005 | 1.03 | 0.028 | 0.00178 | 0.0011 | 0.002 | 0.0057 | 0.0015 |
| 95 | 1.02 | 0.23 | 0.70 | 0.014 | 0.005 | 1.03 | 0.027 | 0.00066 | 0.0011 | 0.001 | 0.0048 | 0.0009 |
| 96 | 0.99 | 0.29 | 0.82 | 0.014 | 0.007 | 1.07 | 0.028 | 0.00098 | 0.0038 | 0.002 | 0.0058 | 0.0009 |
| 97 | 1.02 | 0.20 | 0.77 | 0.015 | 0.009 | 1.18 | 0.026 | 0.00034 | 0.0009 | 0.001 | 0.0074 | 0.0006 |
| 98 | 0.99 | 0.25 | 0.88 | 0.010 | 0.009 | 1.09 | 0.036 | 0.00082 | 0.0063 | 0.002 | 0.0049 | 0.0006 |

[Table 7]

TABLE 7

| | | | | PRODUCTION RESULT | | | | |
|---|---|---|---|---|---|---|---|---|
| | | CHEMICAL COMPOSITION OF CAST PIECE (MASS %) | | | | | | CASTING |
| No. | | V | Mo | W | Ni | Cu | Nb | B | RESULT |
| INVENTIVE EXAMPLE | 1 | | | | | | | | COMPLETELY CAST |
| | 2 | | | | | | | | COMPLETELY CAST |
| | 3 | | | | | | | | COMPLETELY CAST |
| | 4 | | | | | | | | COMPLETELY CAST |
| | 5 | | | | | | | | COMPLETELY CAST |
| | 6 | | | | 1.53 | 0.22 | | | COMPLETELY CAST |
| | 7 | | 0.26 | | 0.45 | 0.34 | | | COMPLETELY CAST |
| | 8 | 0.23 | | | | | | | COMPLETELY CAST |
| | 9 | | | | | | 0.019 | | COMPLETELY CAST |
| | 10 | | | | | | | | COMPLETELY CAST |
| | 11 | | | | | | | | COMPLETELY CAST |
| | 12 | | | | | | | | COMPLETELY CAST |
| | 13 | | | | | | | | COMPLETELY CAST |
| | 14 | | | | | | | | COMPLETELY CAST |
| | 15 | | | | | | | | COMPLETELY CAST |
| | 16 | | | | | | | | COMPLETELY CAST |
| | 17 | | | | | | | | COMPLETELY CAST |
| | 18 | | | | | | | | COMPLETELY CAST |
| | 19 | | | | | | | 0.0025 | COMPLETELY CAST |
| | 20 | | | | | | | | COMPLETELY CAST |
| | 21 | 0.21 | 0.10 | | | | 0.011 | | COMPLETELY CAST |
| | 22 | | | | | | | | COMPLETELY CAST |
| | 23 | | | | | | | | COMPLETELY CAST |
| | 24 | | | | | | | | COMPLETELY CAST |
| | 25 | | | | | | | | COMPLETELY CAST |
| | 26 | | | | | 0.23 | | | COMPLETELY CAST |
| | 27 | | | | | | | | COMPLETELY CAST |
| | 28 | | | | | | | | COMPLETELY CAST |
| | 29 | | | | | | | | COMPLETELY CAST |
| | 30 | | | | | | | | COMPLETELY CAST |

[Table 8]

TABLE 8

| | | | | | PRODUCTION RESULT | | | | |
|---|---|---|---|---|---|---|---|---|---|
| | | | CHEMICAL COMPOSITION OF CAST PIECE (MASS %) | | | | | | CASTING |
| No. | | V | Mo | W | Ni | Cu | Nb | B | RESULT |
| INVENTIVE EXAMPLE | 31 | | 0.27 | | | | | | COMPLETELY CAST |
| | 32 | | | | | | | | COMPLETELY CAST |
| | 33 | | | 0.25 | | | | | COMPLETELY CAST |
| | 34 | | | | 1.62 | | | | COMPLETELY CAST |
| | 35 | | | | | | | | COMPLETELY CAST |
| | 36 | 0.15 | 0.15 | | 0.51 | | | | COMPLETELY CAST |
| | 37 | | | | | | | | COMPLETELY CAST |
| | 38 | | | | | | | | COMPLETELY CAST |
| | 39 | 0.048 | | | | | | | COMPLETELY CAST |

TABLE 8-continued

| | | PRODUCTION RESULT | | | | | | |
|---|---|---|---|---|---|---|---|---|
| | | CHEMICAL COMPOSITION OF CAST PIECE (MASS %) | | | | | | CASTING |
| No. | V | Mo | W | Ni | Cu | Nb | B | RESULT |
| 40 | 0.052 | | | | | | | COMPLETELY CAST |
| 41 | | 0.048 | | | | | | COMPLETELY CAST |
| 42 | | 0.052 | | | | | | COMPLETELY CAST |
| 43 | | | 0.048 | | | | | COMPLETELY CAST |
| 44 | | | 0.055 | | | | | COMPLETELY CAST |
| 45 | | | | 0.09 | | | | COMPLETELY CAST |
| 46 | | | | 0.11 | | | | COMPLETELY CAST |
| 47 | | | | | 0.09 | | | COMPLETELY CAST |
| 48 | | | | | 0.11 | | | COMPLETELY CAST |
| 49 | | | | | | 0.0048 | | COMPLETELY CAST |
| 50 | | | | | | 0.0052 | | COMPLETELY CAST |
| 51 | | | | | | | 0.0005 | COMPLETELY CAST |
| 52 | | | | | | | 0.0005 | COMPLETELY CAST |
| 53 | | | | | | | | COMPLETELY CAST |
| 54 | | | | | | | | COMPLETELY CAST |
| 55 | | | | | | | | COMPLETELY CAST |
| 56 | | | | | | | | COMPLETELY CAST |
| 57 | | | | | | | | COMPLETELY CAST |
| 58 | | | | | | | | COMPLETELY CAST |
| 59 | | | | | | | | COMPLETELY CAST |
| 60 | | | | | | | | COMPLETELY CAST |
| 61 | | | | | | | | COMPLETELY CAST |

[Table 9]

TABLE 9

| | | PRODUCTION RESULT | | | | | | |
|---|---|---|---|---|---|---|---|---|
| | | CHEMICAL COMPOSITION OF CAST PIECE (MASS %) | | | | | | |
| No. | | V | Mo | W | Ni | Cu | Nb | B | CASTING RESULT |
| COMPARATIVE EXAMPLE | 62 | | | | | | | | COMPLETELY CAST |
| | 63 | | | | | | | | COMPLETELY CAST |
| | 64 | | | | | | | | COMPLETELY CAST |
| | 65 | | | | | | | | COMPLETELY CAST |
| | 66 | | | | | | | | COMPLETELY CAST |
| | 67 | | | | | | | | COMPLETELY CAST |
| | 68 | | | | | | | | COMPLETELY CAST |
| | 69 | | | | | | | | INTERRUPTED DUE TO NOZZLE BLOCKAGE |
| | 70 | | | | | | | | COMPLETELY CAST |
| | 71 | | | | | | | | COMPLETELY CAST |
| | 72 | | | | | | | | COMPLETELY CAST |
| | 73 | | | | | | | | COMPLETELY CAST |
| | 74 | | | | | | | | COMPLETELY CAST |
| | 75 | | | | | | | | COMPLETELY CAST |
| | 76 | | | | | | | | COMPLETELY CAST |
| | 77 | | | | | | | | COMPLETELY CAST |
| | 78 | | | | | | | | COMPLETELY CAST |
| | 79 | | | | | | | | COMPLETELY CAST |
| | 80 | | | | | | | | COMPLETELY CAST |
| | 81 | | | | | | | | COMPLETELY CAST |
| | 82 | | | | | | | | COMPLETELY CAST |
| | 83 | | | | | | | | COMPLETELY CAST |
| | 84 | | | | | | | | COMPLETELY CAST |
| | 85 | | | | | | | | COMPLETELY CAST |
| | 86 | | | | | | | | COMPLETELY CAST |
| | 87 | | | | | | | | COMPLETELY CAST |
| | 88 | | | | | | | | COMPLETELY CAST |
| | 89 | | | | | | | | COMPLETELY CAST |
| | 90 | | | | | | | | COMPLETELY CAST |
| | 91 | | | | | | | | COMPLETELY CAST |
| | 92 | 0.72 | | | | | | | COMPLETELY CAST |
| | 93 | | 1.02 | | | | | | COMPLETELY CAST |
| | 94 | | | 1.02 | | | | | COMPLETELY CAST |
| | 95 | | | | 3.52 | | | | COMPLETELY CAST |
| | 96 | | | | | 0.52 | | | COMPLETELY CAST |

TABLE 9-continued

PRODUCTION RESULT

CHEMICAL COMPOSITION OF CAST PIECE (MASS %)

| No. | V | Mo | W | Ni | Cu | Nb | B | CASTING RESULT |
|---|---|---|---|---|---|---|---|---|
| 97 | | | | | | 0.052 | | COMPLETELY CAST |
| 98 | | | | | | | 0.0052 | COMPLETELY CAST |

[Table 10]

TABLE 10

EVALUATION RESULT
METALLOGRAPHIC OBSERVATION

| | No. | STATE OF OXYSULFIDES | $Al_2O_3$ CONTENT IN OXYSULFIDES (MASS %) | NUMBER FRACTION OF OXYSULFIDES IN TOTAL INCLUSIONS (%) | NUMBER OF OXYSULFIDES HAVING MAJOR AXIS OF 5 μm OR MORE (PIECE/mm$^2$) |
|---|---|---|---|---|---|
| INVENTIVE EXAMPLE | 1 | REM-Ca—Al—O—S—(TiN) | 9.5 | 54 | 0.61 |
| | 2 | REM-Ca—Al—O—S—(TiN) | 7.4 | 80 | 0.27 |
| | 3 | REM-Ca—Al—O—S—(TiN) | 12.8 | 77 | 0.68 |
| | 4 | REM-Ca—Al—O—S—(TiN) | 8.4 | 82 | 0.97 |
| | 5 | REM-Ca—Al—O—S—(TiN) | 11.3 | 90 | 0.27 |
| | 6 | REM-Ca—Al—O—S—(TiN) | 8.7 | 72 | 0.88 |
| | 7 | REM-Ca—Al—O—S—(TiN) | 15.5 | 84 | 0.79 |
| | 8 | REM-Ca—Al—O—S—(TiN) | 15.4 | 52 | 1.66 |
| | 9 | REM-Ca—Al—O—S—(TiN) | 10.4 | 94 | 0.25 |
| | 10 | REM-Ca—Al—O—S—(TiN) | 21.9 | 90 | 0.46 |
| | 11 | REM-Ca—Al—O—S—(TiN) | 14.6 | 93 | 0.61 |
| | 12 | REM-Ca—Al—O—S—(TiN) | 6.1 | 78 | 0.27 |
| | 13 | REM-Ca—Al—O—S—(TiN) | 10.9 | 71 | 0.68 |
| | 14 | REM-Ca—Al—O—S—(TiN) | 10.5 | 86 | 0.97 |
| | 15 | REM-Ca—Al—O—S—(TiN) | 10.6 | 90 | 0.65 |
| | 16 | REM-Ca—Al—O—S—(TiN) | 3.1 | 79 | 0.74 |
| | 17 | REM-Ca—Al—O—S—(TiN) | 11.2 | 91 | 0.97 |
| | 18 | REM-Ca—Al—O—S—(TiN) | 13.7 | 94 | 0.61 |
| | 19 | REM-Ca—Al—O—S—(TiN) | 20.0 | 87 | 0.79 |
| | 20 | REM-Ca—Al—O—S—(TiN) | 13.5 | 90 | 0.55 |
| | 21 | REM-Ca—Al—O—S—(TiN) | 16.9 | 80 | 0.65 |
| | 22 | REM-Ca—Al—O—S—(TiN) | 14.5 | 71 | 0.33 |
| | 23 | REM-Ca—Al—O—S—(TiN) | 6.5 | 72 | 0.35 |
| | 24 | REM-Ca—Al—O—S—(TiN) | 11.4 | 79 | 0.655 |
| | 25 | REM-Ca—Al—O—S—(TiN) | 17.1 | 86 | 0.82 |
| | 26 | REM-Ca—Al—O—S—(TiN) | 21.5 | 91 | 0.53 |
| | 27 | REM-Ca—Al—O—S—(TiN) | 11.0 | 85 | 0.85 |
| | 28 | REM-Ca—Al—O—S—(TiN) | 12.2 | 86 | 0.5 |
| | 29 | REM-Ca—Al—O—S—(TiN) | 11.0 | 91 | 0.3 |
| | 30 | REM-Ca—Al—O—S—(TiN) | 7.4 | 72 | 0.71 |

EVALUATION RESULT
METALLOGRAPHIC OBSERVATION

| | No. | NUMBER OF TiN EXISTING INDEPENDENTLY FROM OXYSULFIDES (PIECE/mm$^2$) | TOTAL NUMBER OF MnS AND TiN EXISTING INDEPENDENTLY FROM OXYSULFIDES (PIECE/mm$^2$) | FATIGUE PROPERTIES L10 (×10$^6$ CYCLES) | VICKERS HARDNESS AFTER TEMPERING AT 180° C. (Hv) |
|---|---|---|---|---|---|
| INVENTIVE EXAMPLE | 1 | 0.021 | 4.58 | 15 | 698 |
| | 2 | 0.017 | 2.63 | 11 | 695 |
| | 3 | 0.018 | 4.03 | 10 | 696 |
| | 4 | 0.005 | 1.43 | 14 | 698 |
| | 5 | 0.004 | 1.13 | 18 | 710 |
| | 6 | 0.048 | 2.62 | 18 | 725 |
| | 7 | 0.021 | 2.90 | 22 | 749 |
| | 8 | 0.561 | 4.51 | 12 | 733 |
| | 9 | 0.002 | 2.12 | 18 | 736 |
| | 10 | 0.007 | 2.01 | 16 | 702 |
| | 11 | 0.028 | 2.70 | 16 | 691 |

TABLE 10-continued

| | | | | |
|---|---|---|---|---|
| 12 | 0.027 | 1.62 | 13 | 719 |
| 13 | 0.013 | 3.23 | 17 | 702 |
| 14 | 0.006 | 3.57 | 17 | 698 |
| 15 | 0.010 | 4.01 | 18 | 716 |
| 16 | 0.028 | 3.02 | 18 | 731 |
| 17 | 0.013 | 4.33 | 17 | 710 |
| 18 | 0.005 | 3.75 | 19 | 695 |
| 19 | 0.016 | 1.36 | 18 | 733 |
| 20 | 0.009 | 1.89 | 16 | 706 |
| 21 | 0.023 | 1.56 | 20 | 737 |
| 22 | 0.019 | 2.08 | 17 | 732 |
| 23 | 0.020 | 4.37 | 16 | 705 |
| 24 | 0.177 | 1.57 | 13 | 734 |
| 25 | 0.018 | 3.44 | 19 | 695 |
| 26 | 0.008 | 3.35 | 22 | 736 |
| 27 | 0.021 | 1.40 | 15 | 713 |
| 28 | 0.012 | 4.14 | 17 | 724 |
| 29 | 0.004 | 1.81 | 21 | 718 |
| 30 | 0.040 | 1.68 | 16 | 725 |

[Table 11]

TABLE 11

| | No. | STATE OF OXYSULFIDES | EVALUATION RESULT METALLOGRAPHIC OBSERVATION | | |
|---|---|---|---|---|---|
| | | | $Al_2O_3$ CONTENT IN OXYSULFIDES (MASS %) | NUMBER FRACTION OF OXYSULFIDES IN TOTAL INCLUSIONS (%) | NUMBER OF OXYSULFIDES HAVING MAJOR AXIS OF 5 μm OR MORE (PIECE/mm$^2$) |
| INVENTIVE EXAMPLE | 31 | REM-Ca—Al—O—S—(TiN) | 10.4 | 72 | 0.62 |
| | 32 | REM-Ca—Al—O—S—(TiN) | 14.8 | 90 | 0.46 |
| | 33 | REM-Ca—Al—O—S—(TiN) | 16.7 | 73 | 0.87 |
| | 34 | REM-Ca—Al—O—S—(TiN) | 8.5 | 89 | 0.90 |
| | 35 | REM-Ca—Al—O—S—(TiN) | 3.8 | 93 | 0.45 |
| | 36 | REM-Ca—Al—O—S—(TiN) | 20.7 | 75 | 0.74 |
| | 37 | REM-Ca—Al—O—S—(TiN) | 3.7 | 86 | 0.4 |
| | 38 | REM-Ca—Al—O—S—(TiN) | 16.4 | 73 | 0.68 |
| | 39 | REM-Ca—Al—O—S—(TiN) | 14.4 | 89 | 0.46 |
| | 40 | REM-Ca—Al—O—S—(TiN) | 13.8 | 84 | 0.82 |
| | 41 | REM-Ca—Al—O—S—(TiN) | 13.7 | 89 | 0.46 |
| | 42 | REM-Ca—Al—O—S—(TiN) | 14.4 | 74 | 0.85 |
| | 43 | REM-Ca—Al—O—S—(TiN) | 4.3 | 80 | 0.62 |
| | 44 | REM-Ca—Al—O—S—(TiN) | 8.2 | 72 | 0.87 |
| | 45 | REM-Ca—Al—O—S—(TiN) | 3.7 | 90 | 0.90 |
| | 46 | REM-Ca—Al—O—S—(TiN) | 8.4 | 71 | 0.46 |
| | 47 | REM-Ca—Al—O—S—(TiN) | 5.8 | 90 | 0.82 |
| | 48 | REM-Ca—Al—O—S—(TiN) | 3.4 | 74 | 0.46 |
| | 49 | REM-Ca—Al—O—S—(TiN) | 10.4 | 74 | 0.85 |
| | 50 | REM-Ca—Al—O—S—(TiN) | 9.1 | 94 | 0.62 |
| | 51 | REM-Ca—Al—O—S—(TiN) | 14.8 | 94 | 0.87 |
| | 52 | REM-Ca—Al—O—S—(TiN) | 10.9 | 74 | 0.90 |
| | 53 | REM-Ca—Al—O—S—(TiN) | 5.4 | 82 | 0.85 |
| | 54 | REM-Ca—Al—O—S—(TiN) | 6.0 | 92 | 0.68 |
| | 55 | REM-Ca—Al—O—S—(TiN) | 4.2 | 81 | 0.9 |
| | 56 | REM-Ca—Al—O—S—(TiN) | 11.7 | 70 | 0.6 |
| | 57 | REM-Ca—Al—O—S—(TiN) | 4.2 | 82 | 0.3 |
| | 58 | REM-Ca—Al—O—S—(TiN) | 3.6 | 77 | 0.6 |
| | 59 | REM-Ca—Al—O—S—(TiN) | 14.2 | 92 | 0.68 |
| | 60 | REM-Ca—Al—O—S—(TiN) | 5.3 | 85 | 0.97 |
| | 61 | REM-Ca—Al—O—S—(TiN) | 13.7 | 71 | 0.46 |

TABLE 11-continued

| | No. | NUMBER OF TiN EXISTING INDEPENDENTLY FROM OXYSULFIDES (PIECE/mm$^2$) | TOTAL NUMBER OF MnS AND TiN EXISTING INDEPENDENTLY FROM OXYSULFIDES (PIECE/mm$^2$) | FATIGUE PROPERTIES L10 ($\times 10^6$ CYCLES) | VICKERS HARDNESS AFTER TEMPERING AT 180° C. (Hv) |
|---|---|---|---|---|---|
| INVENTIVE EXAMPLE | 31 | 0.034 | 1.99 | 22 | 738 |
| | 32 | 0.007 | 4.40 | 18 | 704 |
| | 33 | 0.045 | 2.11 | 19 | 733 |
| | 34 | 0.016 | 1.24 | 19 | 733 |
| | 35 | 0.005 | 3.52 | 14 | 701 |
| | 36 | 0.035 | 3.72 | 21 | 741 |
| | 37 | 0.009 | 1.83 | 14 | 712 |
| | 38 | 0.037 | 2.32 | 17 | 698 |
| | 39 | 0.034 | 1.86 | 18 | 734 |
| | 40 | 0.017 | 1.18 | 22 | 738 |
| | 41 | 0.024 | 1.11 | 22 | 732 |
| | 42 | 0.050 | 4.03 | 21 | 728 |
| | 43 | 0.005 | 3.17 | 19 | 722 |
| | 44 | 0.036 | 2.79 | 18 | 739 |
| | 45 | 0.008 | 3.88 | 22 | 733 |
| | 46 | 0.039 | 3.08 | 20 | 695 |
| | 47 | 0.027 | 3.64 | 21 | 697 |
| | 48 | 0.038 | 2.37 | 19 | 712 |
| | 49 | 0.034 | 2.17 | 20 | 701 |
| | 50 | 0.043 | 3.36 | 19 | 718 |
| | 51 | 0.001 | 2.42 | 19 | 718 |
| | 52 | 0.012 | 3.20 | 21 | 714 |
| | 53 | 0.027 | 3.52 | 13 | 725 |
| | 54 | 0.009 | 4.04 | 19 | 705 |
| | 55 | 0.031 | 1.88 | 15 | 725 |
| | 56 | 0.037 | 1.57 | 14 | 739 |
| | 57 | 0.010 | 1.20 | 20 | 722 |
| | 58 | 0.026 | 2.99 | 15 | 740 |
| | 59 | 0.041 | 2.69 | 19 | 715 |
| | 60 | 0.085 | 1.35 | 21 | 705 |
| | 61 | 0.032 | 3.09 | 18 | 695 |

[Table 12]

TABLE 12

| | No. | STATE OF OXYSULFIDES | Al₂O₃ CONTENT IN OXYSULFIDES (MASS %) | NUMBER FRACTION OF OXYSULFIDES IN TOTAL INCLUSIONS (%) | NUMBER OF OXYSULFIDES HAVING MAJOR AXIS OF 5 μm OR MORE (PIECE/mm²) | NUMBER OF TiN EXISTING INDEPENDENTLY FROM OXYSULFIDES (PIECE/mm²) | TOTAL NUMBER OF MnS AND TiN EXISTING INDEPENDENTLY FROM OXYSULFIDES (PIECE/mm²) | FATIGUE PROPERTIES L10 (×10⁶ CYCLES) | VICKERS HARDNESS AFTER TEMPERING AT 180° C. (Hv) |
|---|---|---|---|---|---|---|---|---|---|
| COMPARATIVE EXAMPLE | 62 | REM-O-S | 2.1 | 37 | 3.9 | 0.264 | 5.98 | 6.4 | 731 |
| | 63 | REM-Al-O-S | 5.6 | 35 | 3.5 | 0.265 | 6.18 | 6.3 | 740 |
| | 64 | REM-Al-O-S | 15.0 | 45 | 2.1 | 0.010 | 5.15 | 9.5 | 650 |
| | 65 | REM-Al-O-S | 15.0 | 25 | 4.9 | 0.023 | 5.95 | 4.5 | 650 |
| | 66 | REM-Ca-Al-O-S | 14.8 | 53 | 1.9 | 1.271 | 5.88 | 4.9 | 728 |
| | 67 | REM-Ca-Al-O-S-(TiN) | 13.6 | 35 | 6.1 | 1.618 | 6.80 | 5.8 | 714 |
| | 68 | Al-Ca-O | 68.0 | 36 | 4.4 | 1.310 | 6.19 | 3.7 | 707 |
| | 69 | | | NOZZLE BLOCKAGE OCCURS | | | | | |
| | 70 | Al-Ca-O | 13.7 | 49 | 4.6 | 0.194 | 6.31 | 4.1 | 739 |
| | 71 | Al-Ca-O, REM-Ca-Al-O-S | 4.7 | 39 | 2.8 | 0.173 | 5.99 | 6.2 | 723 |
| | 72 | REM-Ca-Al-O-S-(TiN) (FRACTURE) | 38.8 | 61 | 1.8 | 0.230 | 6.41 | 7.5 | 735 |
| | 73 | MnS | 3.6 | 42 | 2.1 | 0.500 | 6.95 | 8.3 | 692 |
| | 74 | CaO, Al-Ca-O | 5.1 | 35 | 2.1 | 1.100 | 7.35 | 8.5 | 695 |
| | 75 | CaO | 14.6 | 33 | 5.5 | 0.446 | 6.78 | 5.6 | 722 |
| | 76 | REM-Ca-Al-O-S | 14.9 | 52 | 2.0 | 1.269 | 5.87 | 5.0 | 692 |
| | 77 | REM-Ca-Al-O-S | 14.7 | 54 | 1.8 | 1.270 | 5.87 | 5.1 | 701 |
| | 78 | REM-Ca-Al-O-S-(TiN) | 7.0 | 79 | 0.85 | 0.029 | 3.13 | 8.0 | 590 |
| | 79 | | CRACKS OCCUR DURING QUENCHING | | | | | | |
| | 80 | REM-Ca-Al-O-S-(TiN) | 14.5 | 88 | 0.85 | 0.022 | 3.96 | 7.8 | 580 |
| | 81 | | CRACKS OCCUR DURING QUENCHING | | | | | | |
| | 82 | REM-Ca-Al-O-S-(TiN) | 12.5 | 82 | 0.85 | 0.021 | 1.37 | 7.7 | 585 |
| | 83 | | CRACKS OCCUR DURING QUENCHING | | | | | | |
| | 84 | REM-Ca-Al-O-S-(TiN) | 11.2 | 73 | 0.85 | 0.045 | 3.89 | 7.9 | 698 |
| | 85 | REM-Ca-Al-O-S-(TiN) | 5.1 | 76 | 0.85 | 0.028 | 1.84 | 7.7 | 583 |
| | 86 | | CRACKS OCCUR DURING QUENCHING | | | | | | |
| | 87 | REM-Ca-O-S | 1.9 | 36 | 3.5 | 0.230 | 5.95 | 6.3 | 652 |
| | 88 | Al₂O₃, Al-Ca-O | 21.3 | 37 | 3.5 | 0.240 | 5.97 | 6.5 | 661 |
| | 89 | TiN, REM-Ca-Al-O-S-(TiN) | 10.1 | 33 | 5.8 | 1.580 | 6.70 | 6.3 | 633 |
| | 90 | REM-Ca-Al-S | 9.4 | 35 | 3.5 | 0.235 | 5.93 | 6.3 | 636 |
| | 91 | Al2O3, REM-Ca-Al-O-S-(TiN) | 20.8 | 36 | 3.6 | 0.240 | 5.90 | 6.4 | 630 |
| | 92 | REM-Ca-Al-O-S-(TiN) | 8.2 | 85 | 0.85 | 0.050 | 1.15 | 9.2 | 649 |
| | 93 | | CRACKS OCCUR DURING WORKING | | | | | | |
| | 94 | | CRACKS OCCUR DURING WORKING | | | | | | |
| | 95 | REM-Ca-Al-O-S-(TiN) | 5.7 | 87 | 0.85 | 0.022 | 3.67 | 5.2 | 580 |
| | 96 | | CRACKS OCCUR DURING WORKING | | | | | | |
| | 97 | | CRACKS OCCUR DURING WORKING | | | | | | |
| | 98 | | CRACKS OCCUR DURING WORKING | | | | | | |

INDUSTRIAL APPLICABILITY

According to the above aspect of the present invention, it is possible to control the formation and the morphology of $Al_2O_3$, Al—Ca—O complex oxides, MnS, and TiN which are the harmful inclusions by forming the REM-Ca—Al—O—S complex oxysulfides in the metallographic structure of the steel. As a result, it is possible to provide the bearing steel excellent in the fatigue properties and the method for producing the same. Accordingly, the present invention has significant industrial applicability.

REFERENCE SIGNS LIST

A REM-Ca—Al—O—S COMPLEX OXYSULFIDES
B TiN
C PRE-EUTECTOID CEMENTITE
D MnS

The invention claimed is:

1. A bearing steel comprising, as a chemical composition, by mass %,
C: 0.9% to 1.5%,
Si: 0.1% to 0.8%,
Mn: 0.1% to 1.5%,
Cr: 0.5% to 2.0%,
Al: 0.01% to 0.05%,
Ca: 0.00001% to 0.0050%,
Rare Earth Metal: 0.0001% to 0.050%,
O: 0.0001% to 0.0030%,
Ti: limited to less than 0.005%,
N: limited to 0.015% or less,
P: limited to 0.03% or less,
S: limited to 0.05% or less, and
a balance consisting of iron and unavoidable impurities, and
comprising, as a metallographic structure, inclusions which contain complex oxysulfides including Rare Earth Metal, Ca, O, S, and Al, TiN, MnS, $Al_2O_3$, and complex oxides including Al and Ca,
wherein, a number fraction of the complex oxysulfides in a total number of the inclusions is 50% to less than 100% and a number of complex oxysulfides having a major axis of 5 μm or more is 0.001 pieces to 2 pieces in an observed section of 1 $mm^2$, and
a number of TiN existing independently from the complex oxysulfides and having a major axis of 5 μm or more is 0.001 pieces to less than 1.0 piece in the observed section of 1 $mm^2$.

2. The bearing steel according to claim 1,
wherein, when the S content in the chemical composition is more than 0.01% to 0.05%, the Ca content is 0.00050% to 0.0050%.

3. The bearing steel according to claim 1, further comprising, as the chemical composition, by mass %, at least one of
V: 0.05% to 0.70%,
Mo: 0.05% to 1.00%,
W: 0.05% to 1.00%,
Ni: 0.10% to 3.50%,
Cu: 0.10% to 0.50%,
Nb: 0.005% to less than 0.050%, and
B: 0.0005% to 0.0050%.

4. The bearing steel according to claim 2, further comprising, as the chemical composition, by mass %, at least one of
V: 0.05% to 0.70%,
Mo: 0.05% to 1.00%,
W: 0.05% to 1.00%,
Ni: 0.10% to 3.50%,
Cu: 0.10% to 0.50%,
Nb: 0.005% to less than 0.050%, and
B: 0.0005% to 0.0050%.

5. The bearing steel according to any one of claims 1 to 4,
wherein an Al content in the complex oxysulfides is 20 mass % or less in $Al_2O_3$ equivalent.

6. The bearing steel according to any one of claims 1 to 4,
wherein a total number of MnS having a major axis of 10 μm or more and the TiN existing independently from the complex oxysulfides and having the major axis of 5 μm or more is 5 pieces or less in the observed section of 1 $mm^2$.

7. The bearing steel according to claim 3,
wherein the Cu content and the Ni content expressed in mass % satisfy Cu≤Ni.

8. The bearing steel according to claim 4,
wherein the Cu content and the Ni content expressed in mass % satisfy Cu≤Ni.

9. A method for producing a bearing steel, the method comprising:
Al-deoxidizing a molten steel utilizing Al;
REM-deoxidizing the molten steel utilizing Rare Earth Metal after the Al-deoxidizing for 5 minutes to 10 minutes;
casting the molten steel after the REM-deoxidizing so as to obtain a cast piece which includes, as a chemical composition, by mass %,
C: 0.9% to 1.5%,
Si: 0.1% to 0.8%,
Mn: 0.1% to 1.5%,
Cr: 0.5% to 2.0%,
Al: 0.01% to 0.05%,
Ca: 0.00001% to 0.0050%,
Rare Earth Metal: 0.0001% to 0.050%,
O: 0.0001% to 0.0030%,
Ti: limited to less than 0.005%,
N: limited to 0.015% or less,
P: limited to 0.03% or less,
S: limited to 0.05% or less, and
a balance consisting of iron and unavoidable impurities;
heating the cast piece in a temperature range of 1270° C. to 1300° C. and holding the cast piece after the heating in a temperature range of 1200° C. to 1250° C. for 60 seconds or more; and
hot-plastic-working the cast piece after the heating and the holding so as to obtain a hot-worked steel.

10. The method for producing the bearing steel according to claim 9, the method further comprising
vacuum-degassing the molten steel utilizing Ca after the REM-deoxidizing and before the casting, when the molten steel includes, as a chemical composition, by mass %,
S: more than 0.01% to 0.05%.

11. The method for producing the bearing steel according to claim 9,
wherein the cast piece further includes, as the chemical composition, by mass %, at least one of
V: 0.05% to 0.70%,
Mo: 0.05% to 1.00%,
W: 0.05% to 1.00%,
Ni: 0.10% to 3.50%,
Cu: 0.10% to 0.50%, Nb: 0.005% to less than 0.050%, and
B: 0.0005% to 0.0050%.

12. The method for producing the bearing steel according to claim 10,
wherein the cast piece further includes, as the chemical composition, by mass %, at least one of
V: 0.05% to 0.70%,
Mo: 0.05% to 1.00%,
W: 0.05% to 1.00%,
Ni: 0.10% to 3.50%,
Cu: 0.10% to 0.50%,
Nb: 0.005% to less than 0.050%, and
B: 0.0005% to 0.0050%.

13. The method for producing the bearing steel according to any one of claims 9 to 12,
wherein, in the casting, the molten steel is cast while being rotated horizontally in a mold under a condition of 0.1 m/minute to 0.5 m/minute.

14. The method for producing the bearing steel according to any one of claims 9 to 12, the method further comprising
soft-annealing the hot-worked steel after the hot-plastic-working by being heated in a temperature range of 700° C. to 750° C. and by being held for 30 hours to 50 hours so as to obtain a softened steel.

15. The method for producing the bearing steel according to claim 10 or 12, the method further comprising
fluxing the molten steel utilizing CaO—CaF$_2$ for a desulfurization after the REM-deoxidizing and before the vacuum-degassing.

16. A bearing steel comprising, as a chemical composition, by mass %,
C: 0.9% to 1.5%,
Si: 0.1% to 0.8%,
Mn: 0.1% to 1.5%,
Cr: 0.5% to 2.0%,
Al: 0.01% to 0.05%,
Ca: 0.00001% to 0.0050%,
Rare Earth Metal: 0.0001% to 0.050%,
O: 0.0001% to 0.0030%,
Ti: limited to less than 0.005%,
N: limited to 0.015% or less,
P: limited to 0.03% or less,
S: limited to 0.05% or less, and
a balance comprising iron and unavoidable impurities, and
comprising, as a metallographic structure, inclusions which contain complex oxysulfides including Rare Earth Metal, Ca, O, S, and Al, TiN, MnS, Al$_2$O$_3$, and complex oxides including Al and Ca,
wherein, a number fraction of the complex oxysulfides in a total number of the inclusions is 50% to less than 100% and a number of complex oxysulfides having a major axis of 5 μm or more is 0.001 pieces to 2 pieces in an observed section of 1 mm$^2$, and
a number of TiN existing independently from the complex oxysulfides and having a major axis of 5 μm or more is 0.001 pieces to less than 1.0 piece in the observed section of 1 mm$^2$.

17. A method for producing a bearing steel, the method comprising:
Al-deoxidizing a molten steel utilizing Al;
REM-deoxidizing the molten steel utilizing Rare Earth Metal after the Al-deoxidizing for 5 minutes to 10 minutes;
casting the molten steel after the REM-deoxidizing so as to obtain a cast piece which includes, as a chemical composition, by mass %,
C: 0.9% to 1.5%,
Si: 0.1% to 0.8%,
Mn: 0.1% to 1.5%,
Cr: 0.5% to 2.0%,
Al: 0.01% to 0.05%,
Ca: 0.00001% to 0.0050%,
Rare Earth Metal: 0.0001% to 0.050%,
O: 0.0001% to 0.0030%,
Ti: limited to less than 0.005%,
N: limited to 0.015% or less,
P: limited to 0.03% or less,
S: limited to 0.05% or less, and
a balance comprising iron and unavoidable impurities;
heating the cast piece in a temperature range of 1270° C. to 1300° C. and holding the cast piece after the heating in a temperature range of 1200° C. to 1250° C. for 60 seconds or more; and
hot-plastic-working the cast piece after the heating and the holding so as to obtain a hot-worked steel.

* * * * *